US010502154B2

(12) United States Patent  
Sasaki et al.

(10) Patent No.: US 10,502,154 B2  
(45) Date of Patent: Dec. 10, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Keisuke Sasaki, Susono (JP); Noriyasu Adachi, Numazu (JP); Shigehiro Sugihira, Susono (JP); Takayoshi Kawai, Susono (JP); Shinji Sadakane, Susono (JP); Kaoru Otsuka, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/026,948

(22) Filed: Jul. 3, 2018

(65) Prior Publication Data

US 2019/0010887 A1 Jan. 10, 2019

(30) Foreign Application Priority Data

Jul. 6, 2017 (JP) ................................ 2017-133023

(51) Int. Cl.
*F02D 41/22* (2006.01)  
*F01L 13/00* (2006.01)  
(Continued)

(52) U.S. Cl.  
CPC ............ *F02D 41/221* (2013.01); *F01L 1/047* (2013.01); *F01L 1/053* (2013.01); *F01L 13/0036* (2013.01); *F02D 13/023* (2013.01); *F01L 13/0005* (2013.01); *F01L 2013/0052* (2013.01); *F01L 2013/0078* (2013.01); *F01L 2013/101* (2013.01); *F01L 2013/111* (2013.01); *F01L 2013/113* (2013.01); *F01L 2013/116* (2013.01);

(Continued)

(58) Field of Classification Search  
CPC .. F02D 41/221; F02D 2041/001; F01L 1/047; F01L 1/053; F01L 13/0036; F01L 13/023; F01L 13/0005; F01L 2013/0052; F01L 2013/0078; F01L 2013/101; F01L 2013/111; F01L 2013/113; F01L 2013/116; F01L 2201/00; F01L 2250/02; F01L 2250/04; F01L 2800/05; F01L 2800/11  
USPC .......................................... 123/90.18, 90.27  
See application file for complete search history.

(56) References Cited

U.S. PATENT DOCUMENTS 7,438,032 B2   10/2008  Herold et al.

FOREIGN PATENT DOCUMENTS

DE          102012006820         10/2013

*Primary Examiner* — Laert Dounis  
*Assistant Examiner* — Kelsey L Stanek  
(74) *Attorney, Agent, or Firm* — Finnegan, Henderson, Farabow, Garrett & Dunner, LLP

(57) ABSTRACT

An electronic control unit of a control device for an internal combustion engine executes, for a first cycle, first drive processing for controlling an actuator such that a pin drive operation is executed for switching from a first cam to a second cam, executes second drive processing for controlling the actuator such that the pin drive operation is executed again for a second cycle, and executes abnormality determination processing for determining that a cam switching mechanism has an abnormality in a case where a pin returns to a reference position by using a pin return section following a cam switching section of the first cycle after the execution of the first drive processing and the pin returns to the reference position by using the pin return section following the cam switching section of the second cycle after the execution of the second drive processing.

7 Claims, 9 Drawing Sheets

(51) Int. Cl.
    *F01L 1/047*          (2006.01)
    *F01L 1/053*          (2006.01)
    *F02D 13/02*          (2006.01)
    *F02D 41/00*          (2006.01)

(52) U.S. Cl.
    CPC ....... *F01L 2201/00* (2013.01); *F01L 2250/02* (2013.01); *F01L 2250/04* (2013.01); *F01L 2800/05* (2013.01); *F01L 2800/11* (2013.01); *F02D 2041/001* (2013.01)

CONTROL DEVICE FOR INTERNAL COMBUSTION ENGINE

INCORPORATION BY REFERENCE

The disclosure of Japanese Patent Application No. 2017-133023 filed on Jul. 6, 2017 including the specification, drawings and abstract is incorporated herein by reference in its entirety.

BACKGROUND

1. Technical Field

The present disclosure relates to a control device for an internal combustion engine and, more particularly, to a control device controlling an internal combustion engine that is provided with a variable valve device which is capable of switching a valve-driving cam between a plurality of cams.

2. Description of Related Art

U.S. Pat. No. 7,438,032 discloses an internal combustion engine that is provided with a variable valve device which is capable of switching a valve-driving cam between a plurality of cams. The variable valve device is provided with a cam carrier to which the cams are fixed and an electromagnetic actuator. The cam carrier is disposed on a camshaft to be shiftable in the axial direction of the camshaft. A spiral guide groove is formed in the outer peripheral surface of the cam carrier. The actuator has a pin that can be engaged with and disengaged from the guide groove and is configured to allow the pin to protrude toward the guide groove.

In the variable valve device described above, the pin engaged with the guide groove displaces, the cam carrier in the axial direction of the camshaft as the camshaft rotates when the pin is inserted into the guide groove by the action of the actuator. As a result, the valve-driving cam (drive cam) is switched. In the variable valve device, whether or not drive cam switching is performed is determined based on the induced voltage that is generated when the pin leaves the guide groove after displacing the cam carrier.

SUMMARY

In the variable valve device disclosed in U.S. Pat. No. 7,438,032, wear of at least one of the pin and the side wall of the guide groove coming into contact with the pin results in a decrease in the shift amount of the cam carrier (shift member) that is obtained when the pin is engaged with the guide groove. As a result, the drive cam may not be normally switched. Still, according to the technique disclosed in U.S. Pat. No. 7,438,032, a wrong determination that the drive cam is switched may be made based on the induced voltage generated when the guide groove is left in a case where the drive cam is not switched due to pin wear or the like.

The present disclosure provides a control device for an internal combustion engine with which an abnormality can be determined that a drive cam is not switched due to wear of at least one of a pin and a guide groove.

An aspect of the present disclosure relates to a control device for an internal combustion engine. The control device includes a camshaft, a plurality of cams having different profiles, a cam switching mechanism configured to switch a drive cam as a valve-driving cam between the cams, and an electronic control unit. The cam switching mechanism includes a shift member, a pin, an actuator, and a position regulation mechanism. The shift member is configured to rotate with the camshaft. The shift member is configured to shift an axial position with respect to the camshaft in conjunction with the cams. The shift member is provided with a guide groove in an outer peripheral surface of the shift member. The pin is configured to be engaged with and disengaged from the guide groove. The actuator is configured to execute a pin drive operation for allowing the pin to protrude from a reference position toward the shift member. The position regulation mechanism is configured to cause the axial position of the shift member to be a first position or a second position as a result of regulation. The guide groove includes a pin insertion section, a cam switching section, and a pin return section. The actuator is configured to execute the pin drive operation for driving the pin to protrude from the reference position toward the shift member at a pin drive timing for inserting the pin into the pin insertion section of the guide groove. The cam switching section is configured such that the shift member shifts from the first position to the second position as the shift member rotates when the pin is inserted into the pin insertion section. The pin return section is configured such that the pin returns to the reference position after pin passes through the cam switching section. The drive cam is configured to be switched from a first cam to a second cam included in the cams as the shift member shifts from the first position to the second position in the cam switching section. The cam switching mechanism is configured such that the pin returns to the reference position before arrival of the pin return section following the cam switching section arriving first after the pin drive timing in a case where the pin drive operation is executed when the shift member is at the second position. The electronic control unit is configured to execute, for a first cycle, first drive processing for controlling the actuator such that the pin drive operation is executed for switching from the first cam to the second cam. The electronic control unit is configured to execute second drive processing for controlling the actuator such that the pin drive operation is executed again for a second cycle in which switching from the second cam to the first cam is not performed after the execution of the first drive processing, the second cycle being a cycle following the first cycle. The electronic control unit is configured to execute abnormality determination processing for determining that the cam switching mechanism has an abnormality that the drive cam is not switched horn the first cam to the second cam by the first drive processing in a case where the pin returns to the reference position by using the pin return section following the cam switching section of the first cycle after the execution of the first drive processing and the pin returns to the reference position by using the pin return section following the cam switching section of the second cycle after the execution of the second drive processing.

In the control device according to the aspect of the present disclosure, the electronic control unit may be configured to determine that the drive cam is switched from the first cam to the second cam by the first drive processing in a case where the pin returns to the reference position by using the pin return section following the cam switch section of the first cycle after the execution of the first drive processing and the pin does not return to the reference position by using the pin return section following the cam switching section of the second cycle after the execution of the second drive processing in the abnormality determination processing.

In the control device according to the aspect of the present disclosure, the second cycle may be a cycle corresponding to the pin drive timing arriving first after the pin returns to the reference position after the execution of the first drive processing.

In the control device according to the aspect of the present disclosure, the second drive processing may be executed for the second cycle arriving while a predetermined operation condition is used in a case of transition of an operation condition of the internal combustion engine to the predetermined operation condition after the execution of the first drive processing.

In the control device according to the aspect of the present disclosure, the guide groove may be formed such that at least a part of the pin insertion section and at least a part of the pin return section overlap each other in a circumferential direction of the shift member. The electronic control unit may be configured to determine that the drive cam is switched from the first cam to the second cam by the first drive processing in a case where the pin returns to the reference position by using the pin return section following the cam switching section of the first cycle after the execution of the first drive processing and the pin returns to the reference position by using the pin return section following the cam switching section of a cycle immediately preceding the second cycle after the execution of the second drive processing in the abnormality determination processing.

In the control device according to the aspect of the present disclosure, the guide groove may be formed such that the pin insertion section and the pin return section do not overlap each other in a circumferential direction of the shift member. The electronic control unit may be configured to determine that the drive cam is switched from the first cam to the second cam by the first drive processing in a case where the pin returns to the reference position by using the pin return section following the cam switching section of the first cycle after the execution of the first drive processing and the pin returns to the reference position before arrival of the pin return section following the cam switching section of the second cycle after the execution of the second drive processing in the abnormality determination processing.

In the control device according to the aspect of the present disclosure, the electronic control unit may be configured to determine the returning of the pin to the reference position based on an induced electromotive force generated in the actuator when the pin returns.

In a case where, for example, the first drive processing is executed under a situation in which insufficient shifting of the shift member occurs due to wear of at least one of the pin and the guide groove, the pin returns to the reference position by using the pin return section following the cam switching section of the first cycle as in a case where the drive cam is switched from the first cam to the second cam. In the cam switching mechanism, insufficient shifting of the shift member resulting from the first drive processing is canceled by the position regulation mechanism. Accordingly, in a case where the second drive processing is subsequently executed for the second cycle under the above-described situation, the pin returns to the reference position by using the pin return section following the earn switching section of the second cycle as in a case where the first drive processing is already executed. Therefore, according to the abnormality determination processing of the present disclosure, the cam switching mechanism having the abnormality that the drive cam is not switched from the first cam to the second cam by the first drive processing can be determined.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments of the present disclosure will be described with reference to accompanying drawings. The present disclosure is not limited to the numbers, quantities, amounts, ranges, and so on of respective elements mentioned in the following description of the embodiments unless limitation is clearly stated or unless limitation is obvious in principle. Structures, steps, and so on described below in relation to the embodiments are not essential for the present disclosure unless their essentialness is clearly stated or unless their essentialness is obvious in principle.

First Embodiment

1. Configuration of System According to First Embodiment

An internal combustion engine 1 of a system according to the present embodiment is mounted in a vehicle and used as a power source for the vehicle. The internal combustion engine 1 according to the present embodiment is, for example, an in-line four-cylinder four-stroke engine.

Figure 1:
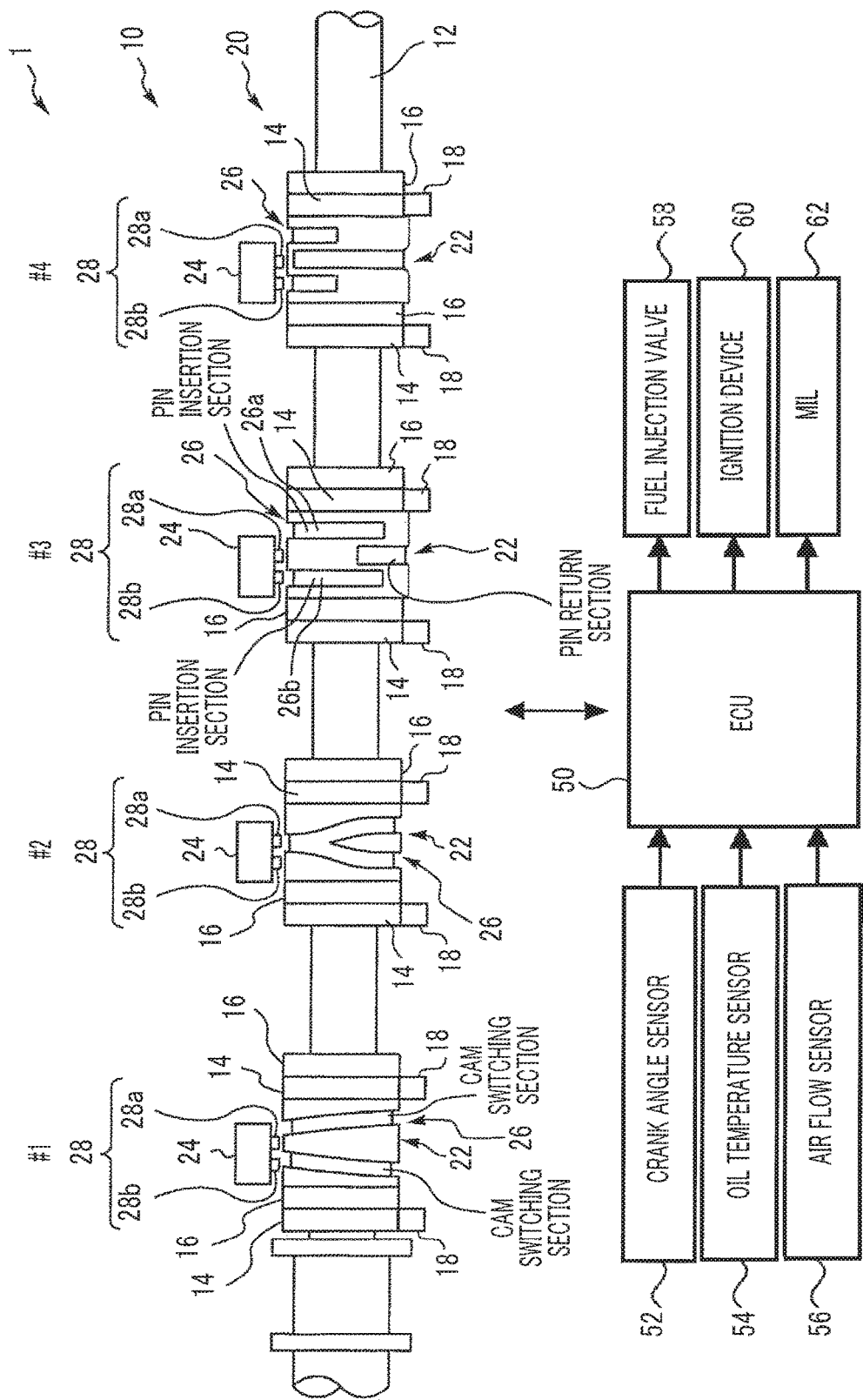
FIG. 1 is a diagram schematically illustrating the configuration of a main part of a variable valve device for an internal combustion engine according to a first embodiment of the present disclosure.

FIG. 1 is a diagram schematically illustrating the configuration of a main part of a variable valve device 10 of the internal combustion engine 1 according to the first embodiment of the present disclosure. Each cylinder of the internal combustion engine 1 is provided with, for example, two intake valves (not illustrated). The internal combustion engine 1 is provided with the variable valve device 10 for driving the two intake valves. The variable valve device 10 to be described below can also be used for driving an exhaust valve instead of the intake valves insofar as the variable valve device 10 is a valve opening and closing a combustion chamber.

1-1. Camshaft

The variable valve device 10 is provided with a camshaft 12 used for driving the intake valve of each cylinder. The camshaft 12 is connected to a crankshaft (not illustrated) via a timing chain (or a timing belt) and a timing pulley (not illustrated). The camshaft 12 rotates synchronously with the crankshaft at a speed of 50% of the speed of the crankshaft.

1-2. Intake Cam

The variable valve device 10 is provided with a plurality of (two, for example) intake cams 14, 16, which have different profiles, with respect to the individual intake valves of each cylinder. The intake cams 14, 16 are disposed on the camshaft 12 in the manner described below. Note that "valve duration" means the length of time, in degrees, that a valve is held open. The intake cam 14, which is one of the intake cams 14, 16, is a "small cam" obtaining a relatively small lift amount and a relatively small valve duration as the lift amount and the valve duration of the intake valve. The other intake cam 16 is a "large cam" obtaining a lift amount and a valve duration exceeding the lift amount and the valve duration obtained by the intake cam 14. A rocker arm 18 for transmitting a pressing force from the intake cam 14 or the intake cam 16 to the valve is disposed for each intake valve. One of the intake cams may also be a zero lift cam giving no pressing force to the intake valve.

1-3. Cam Switching Mechanism

The variable valve device 10 is also provided with a cam switching mechanism 20. The cam switching mechanism 20 performs a cam switching operation for switching the cam driving the intake valve (cam actually transmitting the pressing force to the intake valve, referred to as a "drive cam" hereinbelow) between the intake cams 14, 16. The cam switching mechanism 20 is provided with a cam carrier 22 and an actuator 24 for each cylinder in order to, for example, perform the cam switching operation for each cylinder.

The cam carrier 22 is supported by the camshaft 12 such that the cam carrier 22 is shiftable in the axial direction of the camshaft 12 and with a movement in the rotation direction of the cam carrier 22 restrained. As illustrated in FIG. 1, two pairs of the intake cams 14, 16 for driving the two intake valves of the same cylinder are formed in the cam carrier 22. Each pair of the intake cams 14, 16 is disposed adjacent to the other. The cam carrier 22 is an example of a "shift member". The shift member is not necessarily limited to the cam carrier 22 formed integrally with the intake cams 14, 16 insofar as the shift member rotates with a camshaft and is shiftable in the axial direction of the camshaft in conjunction with a plurality of cams.

1-3-1. Guide Groove

Figure 2:
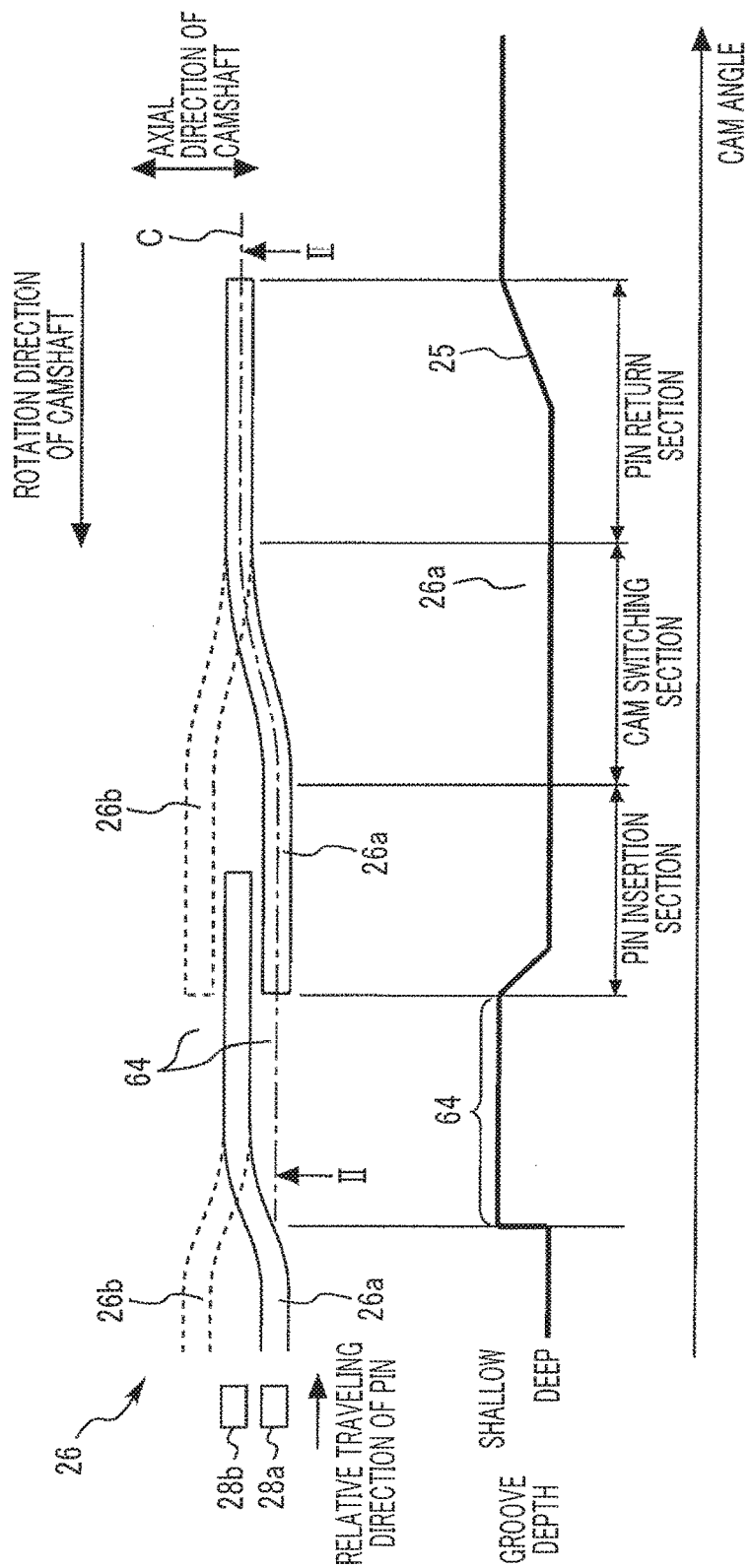
FIG. 2 is a diagram for showing a specific configuration of a guide groove illustrated in FIG. 1.

A guide groove 26 is formed in the outer peripheral surface of the cam carrier 22. FIG. 2 is a diagram for showing a specific configuration of the guide groove 26 illustrated in FIG. 1. More specifically, the upper part of FIG. 2 is a diagram obtained by the guide groove 26 formed in the outer peripheral surface of the cam carrier 22 being developed on a plane.

The guide groove 26 is provided, as a pair of guide grooves 26a, 26b corresponding to a pair of pins 28a, 28b (described in detail later). Each of the guide grooves 26a, 26b is formed to spirally extend in the circumferential direction of the camshaft 12. Each of the guide grooves 26a, 26b includes a "pin insertion section", a "cam switching section", and a "pin return section". In the example that is illustrated in the upper part of FIG. 2, the paths of the guide grooves 26a, 26b merge into one midway. In other words, in this example, the pin return section is shared between the guide grooves 26a, 26b.

A pin 28 is disposed in a state where displacement in the direction perpendicular to the axial direction of the pin 28 is restrained. The actuator 24 allows the pin 28 to protrude toward the cam carrier 22. The pin 28 is engaged with the guide groove 26 in the order of the pin insertion section, the cam switching section, and the pin return section. The configuration of the guide groove 26 will be described below with combination between the guide groove 26a and the pin 28a used as an example. In the following description, the cam carrier 22 is shifted from a "first position" to a "second position" by the cam carrier 22 rotating in a state where the pin 28a and the guide groove 26a are engaged with each other.

A trajectory C of the pin 28a with respect to the guide groove 26a is illustrated in the upper part of FIG. 2. Relative displacement of the pin 28 and the guide groove 26 is caused by the guide groove 26 formed in the cam carrier 22 rotating with the camshaft 12. Accordingly, the relative traveling direction of the pin 28 with respect to the guide groove 26 is opposite to the rotation direction of the camshaft 12 as illustrated in the upper part of FIG. 2. The lower part of FIG. 2 is a longitudinal sectional view of the guide groove 26a obtained by the cam carrier 22 being cut along line II-II in the upper part of FIG. 2 (that is, along the trajectory C of the pin 28a). The guide groove 26b is similar to the guide groove 26a in longitudinal sectional view. Since the internal combustion engine 1 is an in-line four-cylinder engine, the respective guide grooves 26 of the cylinders are formed with a phase difference of 90° in cam angle in an order following the ignition sequence of the internal combustion engine 1.

Pin Insertion Section

The pin insertion section of the guide groove 26a can be engaged with the pin 28a When the cam carrier 22 is at the first position. Accordingly, the pin 28a can be inserted into the guide groove 26a in the pin insertion section by the pill 28a being allowed to protrude from a reference position (refer to FIG. 3) toward the cam carrier 22 when the cam carrier 22 is at the first position.

Cam Switching Section

The cam switching section of the guide groove 26a is a section following the pin insertion section. The cam switching section of the guide groove 26a is disposed to shift the cam carrier 22 from the first position to the second position in conjunction with rotation of the cam carrier 22 during engagement of the pin 28a. As the cam carrier 22 shifts from the first position to the second position in the cam switching section, the drive cam switches from the intake cam (large cam) 16 to the intake cam (small cam) 14. The cam switching section is disposed to be within non-valve lift sections (cam base circle sections) of the intake cams 14, 16 disposed in the cam carrier 22 in which the guide groove 26a is formed.

Pin Return Section

The pin return section of the guide groove 26a is a section following the cam switching section. The pin return section of the guide groove 26a can be engaged with the pin 28a when the cam carrier 22 is at the second position. The pin return section is disposed to return the pin 28a to the reference position after the pin 28a passes through the cam switching section. More specifically, a part (inclined surface 25) that becomes gradually shallow as the distance between the part and the cam switching section increases is provided on the terminal end side of the pin return section as illustrated in the lower part of FIG. 2. The pin 28a leaves the guide groove 26a and returns to the reference position by using the inclined surface 25.

Relationship Between Guide Groove 26a and Guide Groove 26b

The guide groove 26b has a configuration similar to the above-described configuration of the guide groove 26a and shifts the cam carrier 22 from the second position to the first position when the pin 28b is engaged with the guide groove 26b. As a result, the drive cam is switched from the intake cam (small cam) 14 to the intake cam (large cam) 16. Accordingly, the cam switching section of the guide groove 26a and the cam switching section of the guide groove 26b are inclined in opposite directions in the axial direction of the camshaft 12. Although the pin return section is shared between the guide grooves 26a, 26b as described above in the example that is illustrated in the upper part of FIG. 2, the guide groove 26a and the guide groove 26b may also be independent of each other.

1-3-2. Actuator

The actuator 24 is fixed to a stationary member 27 such as a cylinder head at a position facing the cam carrier 22. In the example that is illustrated in FIG. 1, the actuator 24 is disposed for each cylinder to correspond to the cam carrier 22. Each actuator 24 has the pins 28a, 28b that can be engaged with and disengaged from the guide grooves 26a, 26b.

Figure 3:
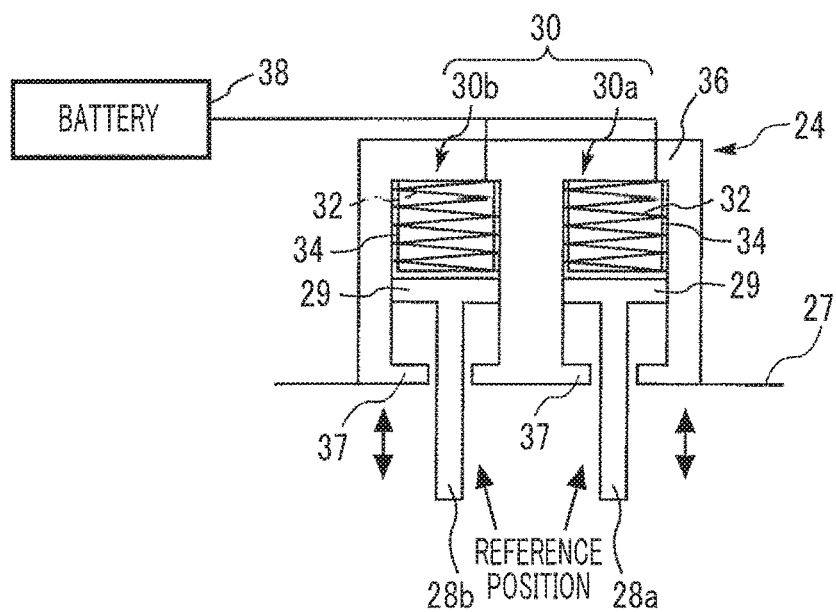
FIG. 3 is a diagram for schematically showing a configuration example of an actuator illustrated in FIG. 1.

FIG. 3 is a diagram for schematically showing a configuration example of the actuator 24 that is illustrated in FIG. 1. The actuator 24 according to the present embodiment is, for example, an electromagnetic solenoid-type actuator. As illustrated in FIG. 3, the actuator 24 is provided with an electromagnet 30 (pair of electromagnets 30a, 30b) in a metallic housing 36 with respect to the pins 28a, 28b, respectively. The electromagnet 30 has a coil 32 and a core 34. The pin 28 is built into the actuator 24. The pin 28 has a plate-shaped magnetic portion 29 formed of a magnetic material in the end portion of the pin 28 that is on the side which faces the electromagnet 30 in the housing 36.

Electric power from a battery 38 is supplied to each electromagnet 30. Energization of the actuator 24 (electromagnet 30) is controlled based on a command from an electronic control unit (ECU) 50 (described later). The position of the pin 28 at a time when the magnetic portion 29 of the pin 28 is adsorbed to the electromagnet 30 without the actuator 24 being energized will be referred to as the "reference position". FIG. 3 illustrates the pin 28 that is at the reference position. The actuator 24 is configured such that the pin 28 repels the electromagnet 30 and protrudes from the reference position toward the cam carrier 22 when energization of the electromagnet 30 is executed. In the following description, an operation for causing the pin 28 to protrude from the reference position toward the cam carrier 22 at a "pin drive timing" for inserting the pin 28 into the pin insertion section will be referred to as a "pin drive operation".

With the actuator 24 that has the configuration described above, the pin 28 can be engaged with the guide groove 26 by energization of the electromagnet 30 being executed at an appropriate pin drive timing (described in detail later). More specifically, in the configuration example of the actuator 24 that is illustrated in FIG. 3, the magnetic portion 29 of the pin 28 is suctioned by a wall surface 37 of the housing 36 on the side opposite to the electromagnet 30 and seated on the wall surface 37 (that is, the pin 28 makes a full stroke) once the pin 28 protrudes toward the cam carrier 22 as a result of the pin drive operation. After the pin 28 is seated on the wall surface 37 as described above, the full stroke state can be maintained without continuation of energization of the actuator 24 being needed.

Pin Return Detection

Once the pin 28 that is engaged with the guide groove 26 enters the pin return section as the cam carrier 22 rotates, the pin 28 is displaced to be pushed back to the electromagnet 30 side by the action of the bottom surface of the pin return section that has a gradually decreasing groove depth. Once the magnetic portion 29 of the pin 28 is pushed back to the electromagnet 30 side beyond the middle position of the stroke of the magnetic portion 29 by the action of the bottom surface, the pin 28 is suctioned by the electromagnet 30 and the pin 28 returns to the reference position (that is, the pin 28 completely leaves the guide groove 26), in the electromagnetic actuator 24, an induced voltage is generated in the coil 32 of the electromagnet 30 when the pin 28 returns to the reference position. The ECU 50 is provided with a detection circuit (not illustrated) for detecting the induced voltage. In abnormality determination processing (described later), the ECU 50 uses the induced voltage to determine the presence or absence of cam switching operation completion.

1-3-3. Position Regulation Mechanism

Figure 4:
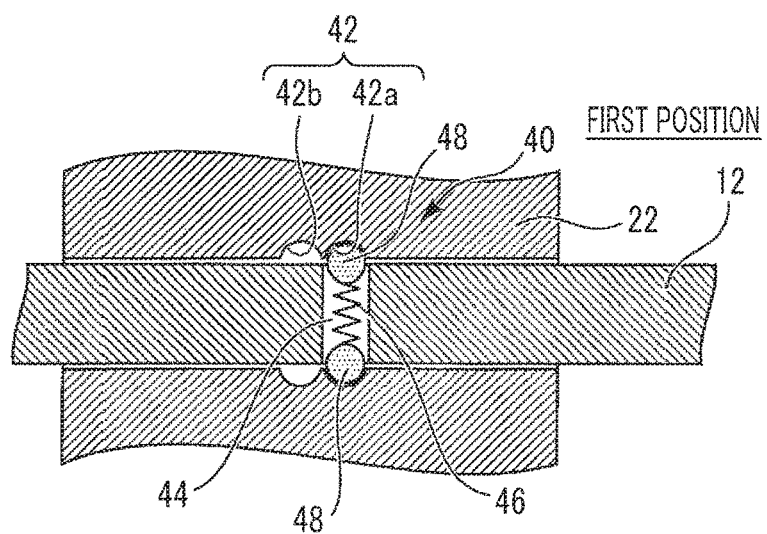
FIG. 4 is a diagram schematically illustrating an example of the configuration of a position regulation mechanism of a cam switching mechanism illustrated in FIG. 1.

FIG. 4 is a diagram schematically illustrating an example of the configuration of a position regulation mechanism 40 of the cam switching mechanism 20 illustrated in FIG. 1 and is a sectional view obtained by the camshaft 12 and the cam carrier 22 being cut along the central axis of the camshaft 12. The position regulation mechanism (also referred to as a decent mechanism) 40 is disposed for each cam carrier 22 and acts such that the position of the can carrier 22 in the axial direction of the camshaft 12 (hereinafter, simply referred to as the "axial position of the cam carrier 22") is the first position or the second position as a result of regulation.

In the example that is illustrated in FIG. 4, a pair of annular grooves 42 (42a, 42b), a through hole 44, a spring 46, and two balls 48 constitute the position regulation mechanism 40. The annular grooves 42a, 42b are formed in the inner peripheral surface of the cam carrier 22 to extend over the entire circumference. The two annular grooves 42a, 42b are disposed adjacent to each other. The tubular through hole 44 is formed in the camshaft 12 to extend in the direction orthogonal to the central axis of the camshaft 12. Each end of the through hole 44 is open in the outer peripheral surface of the camshaft 12 and selectively faces one of the annular grooves 42a, 42b depending on the axial position of the cam carrier 22 (first position or second position).

The spring 46 as an example of an elastic member is accommodated in the through hole 44. The ball 48 is disposed at each end of the spring 46. Each ball 48 is biased in the direction of the annular grooves 42a, 42b by the spring 46.

More specifically, FIG. 4 illustrates the cam carrier 22 that is at the first position. When the cam carrier 22 is at the first position, each ball 48 is engaged with the annular groove 42a as illustrated in FIG. 4. Once displacement of the cam carrier 22 is initiated by the actuator 24, each ball 48 is pushed by the annular groove 42a to be temporarily in the through hole 44 while the cam carrier 22 moves from the first position to the second position. Once the movement of the carrier 22 proceeds subsequently, each ball 48 protrudes from the through hole 44 to enter the annular groove 42b.

Once the cam carrier 22 reaches the second position, each ball 48 is engaged with the annular groove 42b.

In the position regulation mechanism 40 that has the configuration described above, each ball 48 biased toward the annular groove 42a by the spring 46 exerts a holding force for holding the position of the cam carrier 22 at the first position when the cam carrier 22 is at the first position as illustrated in FIG. 4. When the cam carrier 22 is at the second position, each ball 48 biased toward the annular groove 42b by the spring 46 exerts a holding force for holding the cam carrier 22 at the second position.

With the position regulation mechanism 40 provided, shifting of the cam carrier 22 may be canceled and the cam carrier 22 may be returned to the pre-shift initiation position (first position or second position) in a case where a force that insufficiently shifts the cam carrier 22 is given to the Cam carrier 22 in conjunction with the pin drive operation of the actuator 24 (described in detail later with reference to FIG. 7).

As described above, the position regulation mechanism 40 acts such that the axial position of the cam carrier 22 is the first position or the second position as a result of regulation. The position regulation mechanism is not limited to the configuration illustrated in FIG. 4 insofar as the position regulation mechanism has the action as described above. For example, another configuration may also be used that realizes the above-described action by using a magnet.

1-4. Control System

The system according to the present embodiment is provided with the ECU 50 as a control device. Various sensors mounted in the internal combustion engine 1 and the vehicle in which the internal combustion engine 1 is mounted and various actuators for controlling the operation of the internal combustion engine 1 are electrically connected to the ECU 50.

The various sensors include, for example, a crank angle sensor 52, an oil temperature sensor 54, and an air flow sensor 56. The crank angle sensor 52 outputs a signal in accordance with a crank angle. The ECU 50 is capable of acquiring an engine rotation speed by using the crank angle sensor 52. The oil temperature sensor 54 outputs a signal in accordance with the temperature of oil lubricating each portion of the internal combustion engine 1 (including each portion of the variable valve device 10 such as the camshaft 12). The air flow outputs a signal in accordance with the flow rate of air suctioned into the internal combustion engine 1. The various actuators include, for example, a fuel injection valve 58 and an ignition device 60 along the actuator 24. Furthermore, a malfunction indicator lamp (MIL) 62 for informing a driver of an abnormality relating to the cam switching mechanism 20 is mounted in the vehicle. The MIL 62 is electrically connected to the ECU 50.

The ECU 50 is provided with a processor, a memory, and an input-output interface. The input-output interface captures the sensor signals from the various sensors and outputs an operation signal with respect to the various actuators. Various control programs and maps for controlling the various actuators or executing the abnormality determination processing (described later) are stored in the memory. The processor reads the control programs from the memory and executes the control programs. In this manner, the functions of the "control device" according to the present embodiment are realized.

2. Cam Switching Operation

The cam switching operation using the am switching mechanism 20 will be described with reference to FIG. 5. Which one of the intake earn (small cam) 14 and the intake cam (large cam) 16 will be used as the drive cam is determined in accordance with, for example, engine operation conditions (mainly, engine load and engine rotation speed) acquired by the various sensors being used. Drive cam switching is executed by means of the cam base circle section following the termination of an intake valve lift section in a cycle of a cam switching object.

2-1. Pin Drive Timing

Energization Initiation Timing

The cam switching operation e pin drive operation described above. In the electromagnetic actuator 24, the pin drive timing described above is a timing when energization of the actuator 24 is initiated (more specifically, cam angle timing). Accordingly, the pin drive operation is performed by energization of the actuator 24 being initiated at the pin drive timing.

The pin drive timing is determined such that the pin 28 is inserted into the pin insertion section of the guide groove 26. More specifically, the pin drive tinting may be determined such that the pin 28 is directly inserted into the guide groove 26 of the pin insertion section. Alternatively, the pin drive timing may be determined such that the pin 28 is seated on an outer peripheral surface 64 (refer to the first stage of FIG. 5) of the cam carrier 22 positioned closer to the front side in the rotation direction of the camshaft 12 than the pin insertion section. This is because the pin 28 can be inserted into the pin insertion section, even in a case where the pin 28 is seated on the outer peripheral surface 64, by energization continuing until a subsequent timing when the pin 28 faces the pin insertion section.

The amount of change in crank angle per unit time and the amount of change in cam angle resulting therefrom increase as the engine rotation speed ($\propto$ camshaft rotation speed) increases. Accordingly, the pin drive timing may be changed in accordance with the engine rotation speed. More specifically, the pin drive timing may be increasingly advanced as the engine rotation speed increases. The pin drive operation is likely to be hindered by the oil when the viscosity of the oil is relatively low due to a relatively low temperature of the oil. Accordingly, the pin drive timing may be changed in accordance with, for example, the temperature of the oil. More specifically, the pin drive timing may be increasingly advanced as the temperature of the oil decreases.

Energization Termination Timing

Figure 8:
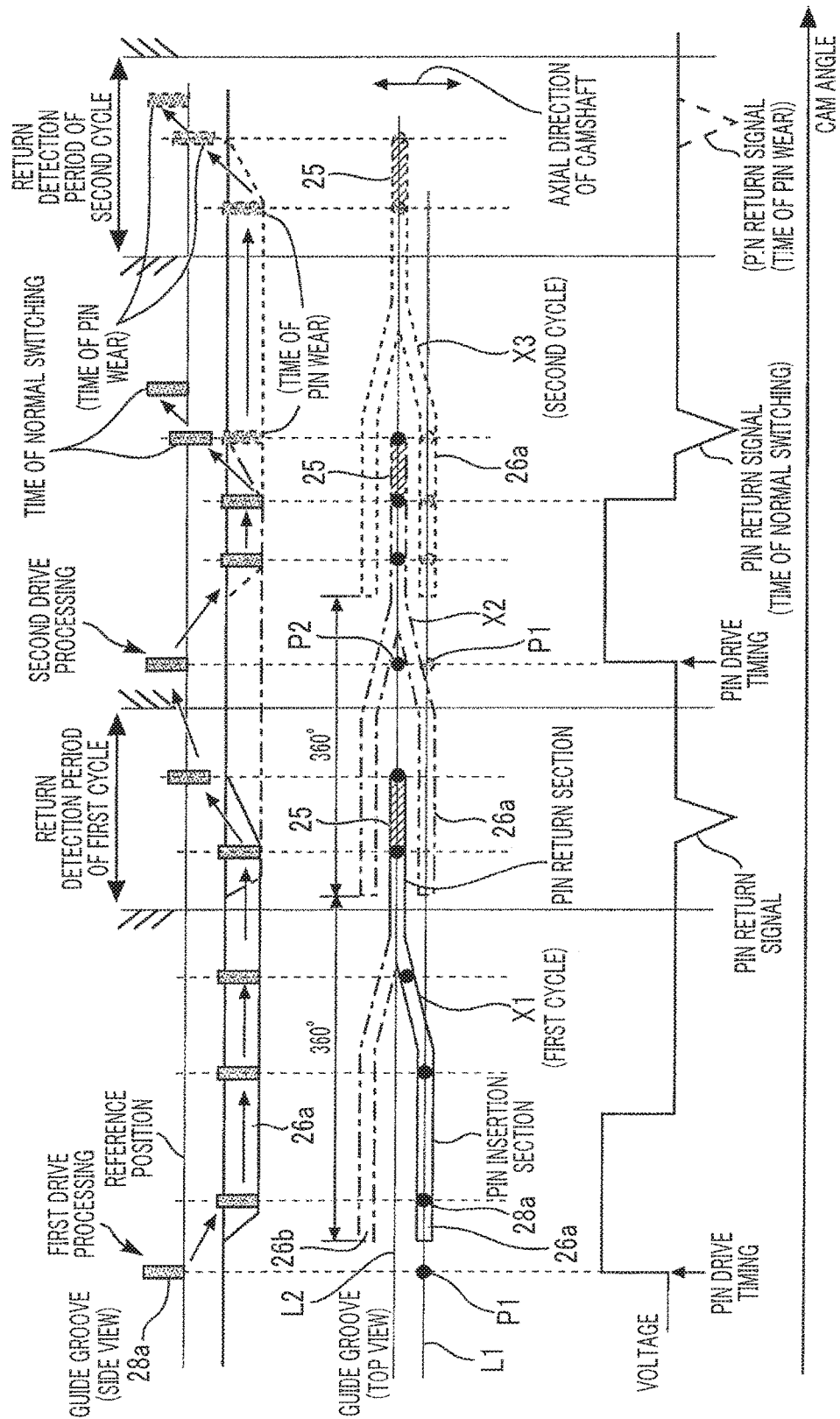
FIG. 8 is a diagram for showing the operation of a pin and a change in actuator voltage at a time when abnormality determination processing of the cam switching mechanism according to the first embodiment is executed.

The energization termination timing (cam angle timing) of the actuator 24 is set such that the energization termination timing (cam angle timing) of the actuator 24 is a timing preceding the arrival of the pin return section following the cam switching section of the cycle of the cam switching object at the latest. In the actuator 24 that has the configuration described above, the full stroke state can be maintained without energization continuation after the pin 28 is allowed to make a full stroke. Accordingly, the energization termination timing may also be a timing needed for the shortest energization period needed for the full stroke of the pin 28 to be ensured. In the example that is illustrated in FIG. 8 (described later), however, the energization termination timing is determined such that, for example, the energization termination timing is a predetermined timing in the pin insertion section. This is to give a margin for the energization period in view of mechanical variations of the relationship between the position (cam angle) of the guide groove 26 grasped based on the signal of the crank angle sensor 52 and the actual position of the guide groove. The predetermined timing may be appropriately changed in accordance with the engine rotation speed as is the case with the energization initiation timing.

2-2. Cam Switching Operation from Large Cam to Small Cam

Figure 5:
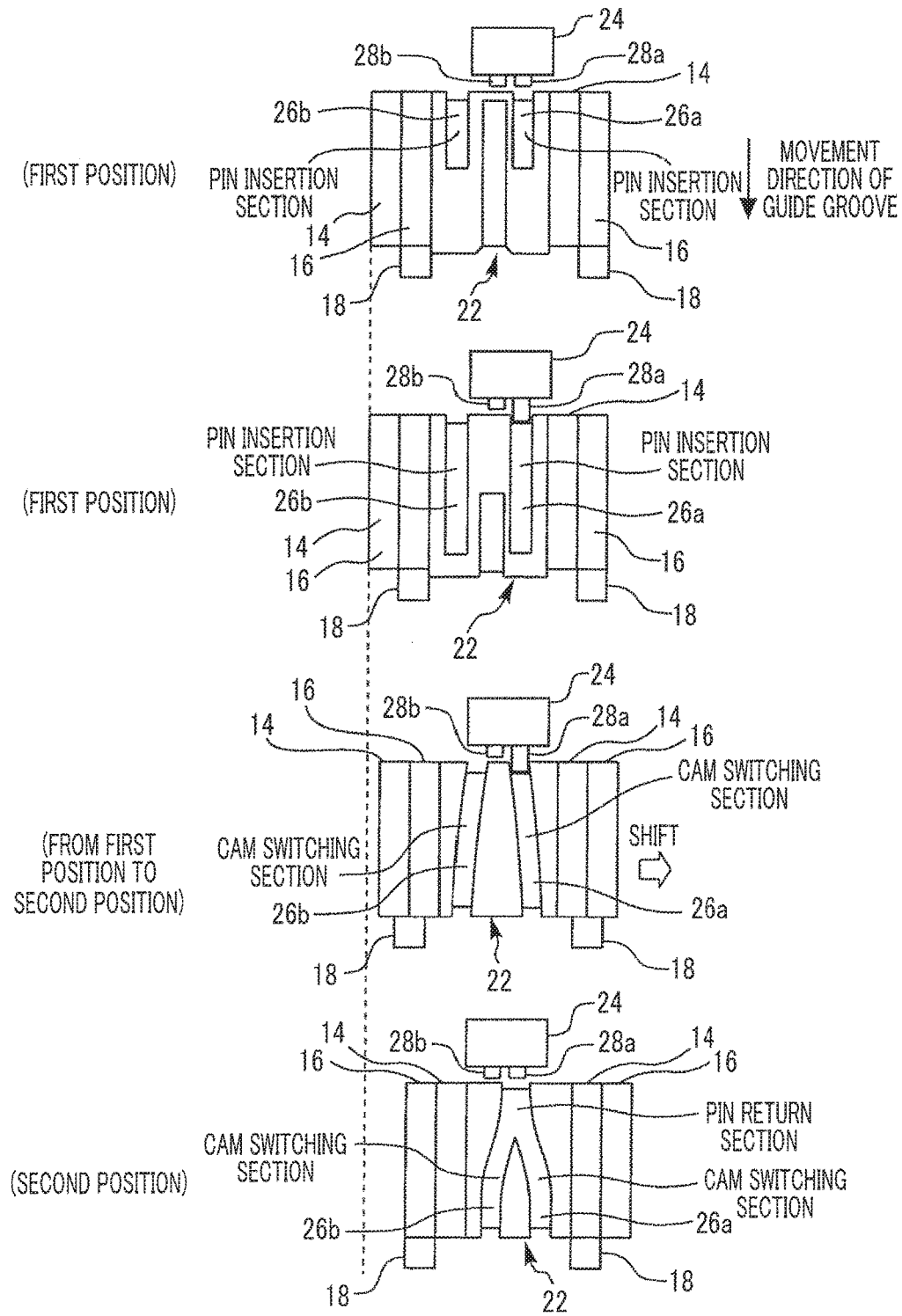
FIG. 5 is a diagram for showing an example of a cam switching operation by the cam switching mechanism.

FIG. 5 is a diagram for showing an example of the cam switching operation by the cam switching mechanism 20. More specifically. FIG. 5 is used for describing the cam switching operation from the intake cam (large cam) 16 to the intake cam (small cam) 14. In FIG. 5, the guide groove 26 moves from the top to the bottom of the page as the cam carrier 22 rotates.

In the first stage of FIG. 5, the cam carrier 22 is at the first position, and thus the pin insertion section of the guide groove 26a faces the pin 28a and each rocker arm 18 is in contact with the intake cam 16. In the state that is illustrated in the first stage of FIG. 5, the electromagnets 30a, 30b are not energized by the actuator 24.

The second stage of FIG. 5 corresponds to a state where the camshaft 12 (cam carrier 22) has rotated by 90° from the state that is illustrated in the first stage of FIG. 5. In the second stage of FIG. 5, engagement of the pin 28a with the guide groove 26a in the pin insertion section is illustrated as a result of the execution of the pin drive operation resulting from the execution of energization of the actuator 24 (electromagnet 30a in this example).

The third stage of FIG. 5 corresponds to a state where the camshaft 12 has rotated again by 90° from the state that is illustrated in the second stage of FIG. 5. The pin 28a enters the cam switching section from the pin insertion section as the cam carrier 22 rotates. The third stage of FIG. 5 illustrates a state where the pin 28a shifts the cam carrier 22 in contact with the side wall of the guide groove 26a in the cam switching section (that is, the cam carrier 22 in the process of shifting from the first position toward the second position (to the right in the third stage of FIG. 5)).

The fourth stage of FIG. 5 corresponds to a state where the camshaft 12 has rotated again by 90° from the state that is illustrated in the third stage of FIG. 5. The pin 28a enters the pin return section after completely passing through the cam switching section. Once the pin 28a enters the pin return section, the pin 28a is pushed back to the electromagnet 30a side by the action of the bottom surface of the pin return section as described above. The ECU 50 detects the induced voltage while the pin 28a returns to the reference position. Once the pin 28a is suctioned by the electromagnet 30a and returns to the reference position, the pin 28a completely leaves the guide groove 26a. The cam carrier 22 and the actuator 24 at a time when the pin 28a completely leaves the guide groove 26a (time when the pin 28a returns to the reference position) are illustrated in the fourth stage of FIG. 5.

In the fourth stage of FIG. 5, the rightward shifting of the cam carrier 22 in the third stage of FIG. 5 is also already completed. Accordingly, the cam switching operation for switching the cam giving the pressing force to the rocker arm 18 from the intake cam (large cam) 16 to the intake cam (small cam) 14 is already completed. By the cam switching operation as described above being performed, drive cam switching can be performed during each rotation of the camshaft 12. In the state that is illustrated in the fourth stage of FIG. 5, the cam carrier 22 is at the second position, and thus the pin 28b faces the pin insertion section of the guide groove 26b.

2-3. Cam Switching Operation from Small Cam to Large Cam

The cam switching operation from the intake cam (small cam) 14 to the intake cam (large cam) 16 is similar to the above-described cam switching operation from the intake cam (large cam) 16 to the intake cam (small cam) 14, and thus merely an overview thereof will be described below.

In other words, the cam switching operation froth the small cam to the large cam is initiated by the pin drive operation that is performed at the above-described pin drive timing when the cam carrier 22 is at the second position as illustrated in the fourth stage of FIG. 5. In this example, the cam carrier 22 shifts to the left, contrary to the operation illustrated in the third stage of FIG. 5, as the camshaft 12 rotates while the pin 28b passes through the cam switching section. Once the pin 28b completely passes through the cam switching section subsequently, shifting of the cam carrier 22 from the second position to the first position is completed and switching from the intake cam (small cam) 14 to the intake cam (large cam) 16 is completed. The pin 28b leaves the guide groove 26b and returns to the reference position.

3. Abnormality Determination Processing of Cam Switching Mechanism (Cam Switching Operation) According to First Embodiment As described above, in the electromagnetic actuator 24, the induced voltage is generated when the pin 28 inserted into the guide groove 26 by the pin drive operation returns to the reference position by using the pin return section. Hereinafter, the induced voltage generated as described above will also be referred to as a "pin return signal".

In a case where the cam switching operation is normally performed, the pin return signal (induced voltage) is detected by the ECU 50 in a "return detection period" (refer to FIG. 8 (described later)) provided to include the period when the pin 28 passes through the pin return section. Accordingly, in a case where the pin return signal is not detected in the return detection period, it is conceivable that the cam switching operation is not normally performed the cam switching mechanism 20 has any abnormality as a result. The following Examples 1 to 4 are conceivable as specific examples of the abnormality.

Example 1: Abnormality of a Solenoid Drive Circuit (Drive Circuit Relating to a Switch Controlling Energization of the Electromagnet 30 (not Illustrated)) of the ECU 50 (Such as Short Circuit and Disconnection of the Switch)

Example 2: Breakage of the Pin 28

Example 3: Fixation of the Pin 28 (Attributable to, for Example, Contamination of the Inside of the Actuator 24 by Foreign Matters)

Example 4: Disconnection of the Coil 32

With the switch disconnected in Example 1, the electromagnet 30 is not energized, and thus the pin drive operation is not performed. As a result, the cam switching operation is not performed and the pin return signal is not generated. With the switch short-circuited, energization of the electromagnet 30 is performed at an unintended timing that differs from the pin drive timing based on a earn switching demand. Accordingly, the cam switching operation is performed in a cycle preceding a cycle when switching should be performed based on the cam switching demand, and the pin return signal is not detected in a pin return detection section corresponding to a regular pin drive timing based on the cam switching operation.

With the pin 28 broken as in Example 2, the pin 28 may not be engaged with the guide groove 26 despite the full stroke of the pin 28. As a result, the cam switching operation May not be performed even when the operation of the actuator 24 for allowing the pin 28 to protrude is normal. The pin 28 is incapable of using the inclined surface 25 of the pin return section, and thus the pin return signal may not be generated. Engagement of the pin 28 with the guide groove 26 can be grasped in a case where the pin return signal is generated by means of the guide groove 26 that is formed to return the pin 28 by using the inclined surface 25 of the pin return section.

In Examples 3 and 4, the pin drive operation is not performed, and thus the cam switching operation is not performed and the pin return signal is not generated.

3-1. Task Relating to Abnormality Determination

The pin return signal is normally detected (in a regular return detection period) in a case where the cam switching operation is normally performed as described above. The "regular return detection period" means a return detection period corresponding to the pin return section following the cam switching section of a cycle becoming an insertion object (cam switching object) of the pin 28 based on the cam switching demand. In a case where an abnormality as in Examples 1 to 4 described above has occurred, the pin return signal is not generated or, if generated, no pin return signal is detected in the regular return detection period.

Conceivable in a case where the cam switching mechanism 20 performs the cam switching operation based on the cam switching demand is determining the presence or absence of the abnormality of the cam switching mechanism 20 based on whether or not the pin return signal is detected in the regular return detection period. However, regarding the abnormality determination as described above, the inventors of the present disclosure have found through diligent research that there is an example of abnormality in which cam switching is not normally performed even when the pin 28 normally enters and leaves the guide groove 26 in conjunction with the pin drive operation (that is, even when the pin return signal is detected in the regular return detection period after pin drive operation execution). This example is, for example, the progress of wear of (the peripheral surface of) the pin 28.

Decrease in Shift Amount Attributable to Pin Wear

Figure 6:
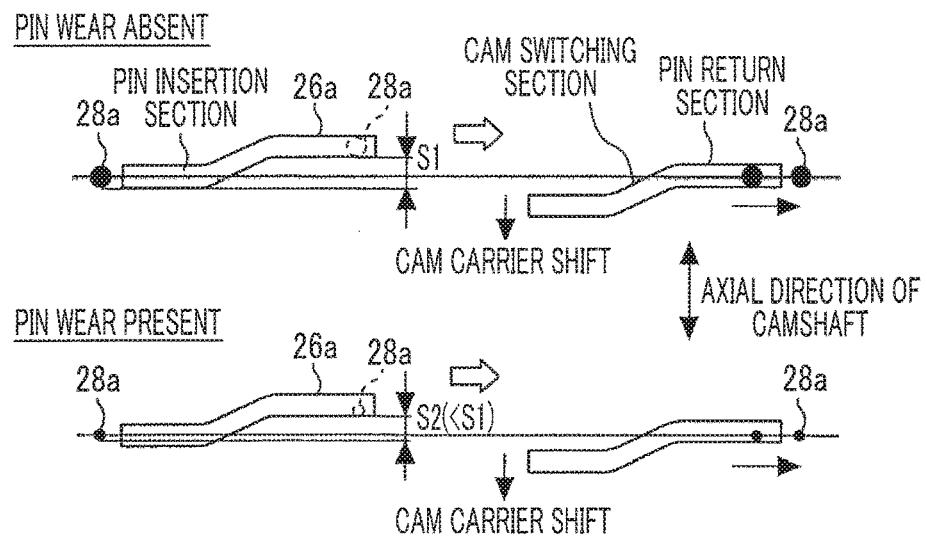
FIG. 6 is a diagram for showing a difference in care carrier shift amount depending on the presence or absence of pin wear.

FIG. 6 is a diagram for showing a difference in the shift amount of the cam carrier 22 depending on the presence or absence of wear of the pin 28. More specifically, the upper part of FIG. 6 corresponds to an example in which there is no wear of the pin 28 and the lower part of FIG. 6 corresponds to an example in which the peripheral surface of the pin 28 wears over time. Combination between the pin 28a and the guide groove 26a is exemplified in the description of FIG. 6.

The positional relationship between the pin 28a and the guide groove 26a immediately before the pin 28a enters the pin insertion section of the guide groove 26a and the positional relationship between the pin 28a and the guide groove 26a after normal shifting of the cam carrier 22 (immediately after the pin 28a is removed from the guide groove 26a in the pin return section) are illustrated in the upper part of FIG. 6. As illustrated in the upper part of FIG. 6, in this example, the shift amount of the cam carrier 22 resulting from the pin drive operation is equal to a distance S1 between the position of the side wall of the pin insertion section and the position of the side wall of the pin return section on the side where the pin 28a is in contact with the guide groove 26a in the cam switching section (lower side in the upper part of FIG. 6).

The diameter of the pin 28a in the example that is illustrated in the lower part of FIG. 6 decreases due to wear.

The pin 28a wears with the diameter on the decrease as described above because the side wall of the guide groove 26a slides while being pressed by the pin 28a when the cam carrier 22 shifts in the cam switching section and rotation of the pin 28a with respect to the housing 36 of the actuator 24 is allowed.

The cam carrier 22 shifts while the side wall of the guide groove 26a (side wall on the lower side in the lower part of FIG. 6) is in contact with the pin 28a in the cam switching section as described above. Accordingly, the shift amount of the cam carrier 22 in this example is equal to a distance S2 between the position of the peripheral surface of the pin 28a and the position of the side wall of the pin return section on the lower side of the lower part of FIG. 6 (side in contact with the side wall of the guide groove 26a) in the pre-shift (left side) positional relationship in the lower part of FIG. 6.

The distance S2 is shorter than the distance S1 as is apparent from comparison between the upper and lower parts of FIG. 6. The shift amount of the cam carrier 22 decreases when the peripheral surface of the pin 28 wears over time as described above. The occurrence of the phenomenon in which the shift amount of the cam carrier 22 decreases due to the progress of wear is not limited to a case where the peripheral surface of the pin 28 wears. In other words, the shift amount may decrease also in a case where the progress of wear of the side wall of the guide groove 26 on the side in contact with the pill 28 in the cam switching section occurs from the cam switching section to the pin return section. As described above, the shift amount may decrease due to wear of at least one of the peripheral, surface of the pin 28 and the side wall of the guide groove 26 in contact with the peripheral surface of the pin 28.

In addition, the pin 28a wears even on the premise that rotation of the pin 28a with respect to the housing 36 is restrained unlike in the example that is illustrated in FIG. 6. More specifically, although the progress of wear of the pin 28a occurs at a part on the side where the guide groove 26a is pressed (lower side of the upper part of FIG. 6) in this example, a decrease in the shift amount of the cam carrier 22 is similar to that in the example illustrated in FIG. 6.

Action of Position Regulation Mechanism during Insufficient Shifting

Figure 7:
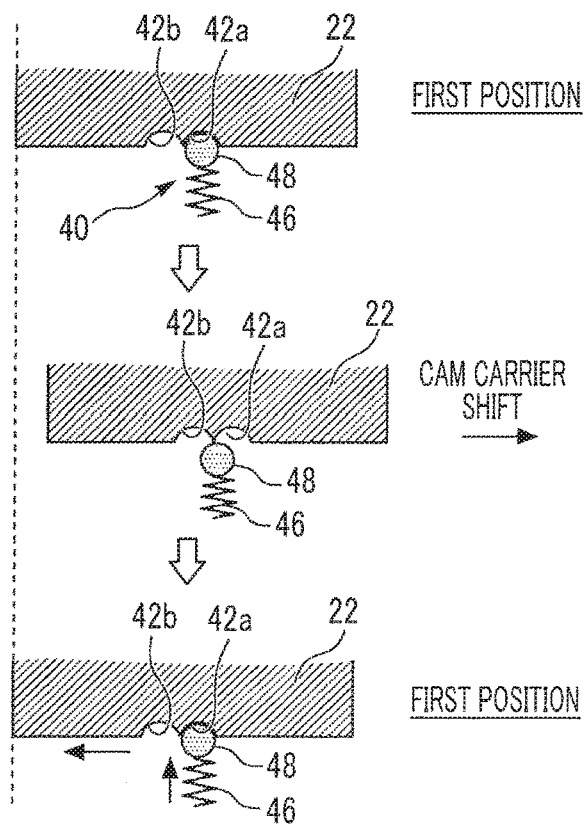
FIG. 7 is a diagram for showing the action of the position regulation mechanism during insufficient cam carrier shifting.

FIG. 7 is a diagram for showing the action of the position regulation mechanism 40 during insufficient shifting of the cam carrier 22. The upper part of FIG. 7 illustrates a state where the cam carrier 22 is held at the first position as in FIG. 4. The middle stage of FIG. 7 illustrates a time when insufficient shifting of the cam carrier 22 attributable to wear of the pin 28a is performed from the first position. In the state that is illustrated in the middle stage of FIG. 7, the ball 48 of the position regulation mechanism 40 is incapable of climbing over the boundary between the annular groove 42a and the annular groove 42b due to the insufficient shifting.

In a case where insufficient shifting as illustrated in the middle stage of FIG. 7 is performed, the ball 48 biased by the spring 46 enters the annular groove 42a while pushing the wall surface of the annular groove 42a. As a result, the cam carrier 22 is returned to the first position as illustrated in the lower part of FIG. 7. As described above, the position regulation mechanism 40 acts such that the cam carrier is at the first position or the second position (first position in the example illustrated in FIG. 7) as a result of regulation when insufficient shifting of the cam carrier 22 has occurred.

Pin Return Signal during Pin Wear

As described above with reference to FIGS. 6 and 7, in the cam switching mechanism 20 provided with the position regulation mechanism 40, the cam carrier 22 is returned to the first position prior to shifting initiation or the second position in a case where, for example, insufficient shifting of the cam carrier 22 is performed due to wear of the pin 28. However, even in a case where the insufficient shifting as described above is performed, the pin 28 leaves the guide groove 26 by using the inclined surface 25 of the pin return section following the cam switching section of the cycle of the cam switching object, and thus the pin return signal is detected in the regular return detection period. Accordingly, an example in which the cam switching operation is normally performed and an example of abnormality in which the cam switching operation is not performed due to pin wear or the like cannot be distinguished simply by determining whether or not the pin return signal is detected in the regular return detection period after the execution of the pin drive operation based on the cam switching demand.

3-2. Overview of Abnormality Determination Processing of Cam Switching Mechanism According to First Embodiment In the present embodiment, the ECU 50 executes the following processing that will be described with reference to FIG. 8 so that the example in which the cam switching operation is normally performed and the example of abnormality in which the cam switching operation is not performed due to pin wear or the like can be distinguished. Switching from the intake cam (large cam; example of the "first cam") 16 to the intake cam (small cam; example of the "second cam") 14 will be described below as an example with a first cycle used as an object.

FIG. 8 is a diagram for showing the operation of the pin 28a and the change in the voltage of the actuator 24 (coil 32) at a time when the abnormality determination processing of the cam switching mechanism 20 according to the first embodiment is executed. More specifically, a side view of the guide groove 26a, a top view of the guide grooves 26a, 26b, and the voltage waveform of the coil 32 are illustrated in FIG. 8. The guide grooves 26a, 26b of three consecutive cycles with regard to the same cam carrier 22 are illustrated in the top view. The guide grooves 26a of the three cycles are illustrated in an overlapping manner in the side view. Although the guide groove 26a, not the pin 28a, actually shifts in the axial direction of the camshaft 12, a change in the relative position of the pin 28a based on the guide groove 26a is illustrated in the top view for convenience of description.

Overlapping of Guide Groove

As illustrated in FIG. 8, the guide groove 26 according to the present embodiment is, for example, formed across a cam angle section of at least 360° (one round of the cam carrier 22). Accordingly, a part of the pin insertion section and a part of the pin return section overlap each other in the circumferential direction of the cam carrier 22. Hereinafter, the above will be simply referred to as "overlap" of the guide groove 26. In the example that is illustrated in FIG. 8, the return detection period (cam angle period) for the ECU 50 to detect the pin return signal is set, for example, with a margin as a period that has the pin return section of the guide groove 26 and predetermined cam angle sections preceding and following the pin return section of the guide groove 26 as objects in view of mechanical variations of the position (cam angle) of the guide groove 26.

When there is overlap as in the guide groove 26 according to the present embodiment, the pin return section following the cam switching section of a cam switching object cycle reaches the next cycle of the cam switching object cycle in an example. In this example, drive cam switching occurring in the cam switching section and returning of the pin 28 occurring in the pin return section are not completed in the same cycle. To avoid misunderstanding, in the present specification, the "pin return section following the cam switching section" of a certain cycle will be mentioned during description of the pin 28 returning in the pin return section corresponding to the cycle (cam switching object cycle) in a case where drive cam switching is performed for the cycle as an object, 3-2-1, First Drive Processing The ECU 50 controls the actuator 24 for the first cycle such that the pin drive operation is executed for switching from the intake cam 16 to the intake cam 14 (that is, such that the pin 28a is driven at the pin drive timing) (first drive processing). Illustrated in FIG. 8 is an example in which the cam switching operation for switching from the intake cam 16 to the intake cam 14 is normally performed as a result of first drive processing execution. In tins example, the pin return signal is detected in the return detection period (regular return detection period) of the first cycle as an object of the first drive processing as illustrated in FIG. 8. In other words, the pin 28a returns to the reference position by using the pin return section that follows a cam switching section X1 of the first cycle after first drive processing execution. In the top view of FIG. 8, "P1" indicates the axial position of the camshaft 12 of the pin 28a prior to first drive processing initiation.

3-2-2, Second Drive Processing

When Cam Switching Operation is Normally Performed by First Drive Processing

When a change in the position of the pin 28a based on the guide groove 26a is taken into account, the pin 28a moves from a position on a straight line L1 corresponding to the pin insertion section to a position on a straight line L2 corresponding to the pin return section as illustrated in FIG. 8 in a case Where the cam switching operation is normally performed as a result of first drive processing execution. The pin drive timing that arrives second in FIG. 8 corresponds to the pin drive timing that arrives first after the pin 28a returns to the reference position after first drive processing execution (more precisely, the energisation initiation timing when the pin 28a is inserted into the pin insertion section when the cam carrier 22 is at the first position). The guide groove 26a on the rightmost side in FIG. 8 corresponds to the guide groove 26a of a second cycle corresponding to the pin drive timing. In other words, in the example that is illustrated in FIG. 8, the cycle after two cycles from the first cycle corresponds to the second cycle.

In a case where the pin return signal is detected in the regular return detection period after first drive processing execution, the ECU 50 controls the actuator 24 for the second cycle such that the pin 28a is driven again at the pin drive timing (second drive processing). In other words, in the second drive processing, the pin drive operation is executed again with the pin 28a that is an object of the first drive processing used as an object. More specifically, the second drive processing is executed without the pin drive operation in which another pin (pin 28b in the example of the cam switching mechanism 20) is an object intervening between the first drive processing and the second drive processing. In other words, the second cycle is a cycle in which switching from the second cam (intake cam 14 in this example) to the first cam (intake cam 16 in this example) is not performed after the first drive processing. In the top view of FIG. 8, "P2" indicates the axial position of the camshaft 12 of the pin 28a prior to second drive processing initiation in a case where the cam switching operation is normally performed by the first drive processing.

In a case where the cam switching operation is normally performed by the first drive processing, the pin 28a is allowed to protrude toward the cam carrier 22 by the second drive processing at the position P2. At the position P2, the pin 28a cannot be engaged with the pin insertion section of the guide groove 26a of the first cycle. Accordingly, as illustrated in FIG. 8, the pin 28a returns to the reference position by using the inclined surface 25 of the pin return section following a cam switching section X2 of the cycle immediately preceding the second cycle without returning to the reference position by using the inclined surface 25 of the pin return section following a cam switching section X3 of the second cycle after second drive processing execution. As a result, the pin return signal in this case (solid line) is generated at a timing earlier than the return detection period of the second cycle, and thus is not detected during the return detection period.

In addition, in the cam switching mechanism 20 according to the present embodiment provided with the guide groove 26 that has the overlap, the pin 28 returns to the reference position by using the inclined surface 25 of the pin return section following the cam switching section X2 of the cycle immediately preceding the second cycle after second drive processing execution in a case where the cam switching operation is normally performed by the first drive processing as described above. As described above, the cam switching mechanism 20 has the function that the "pin returns to the reference position before the arrival of the pin return section following the cam switching section arriving first after the pin drive timing of the pin drive operation (pin return section of the second cycle in the example that is illustrated in FIG. 8) in a case where the pin drive operation is executed when the shift member (cam carrier 22) is at the second position". The above-described function is not limited to the example of the profile of the guide groove 26 illustrated in FIG. 8 and is obtained when at least a part of the pin insertion section and a part of the pin return section overlap each other in the circumferential direction of the shift member (cam carrier).

When Pin Wear Occurs

As described above with reference to FIG. 7, the cam carrier 22 is returned to the first position by the action of the position regulation Mechanism 40 in a case where insufficient shifting attributable to pin wear or the like is performed. Accordingly, in the top view illustrated in FIG. 8, the position of the pin 28a at a time when the pin drive timing of the second cycle arrives is P1, not P2, as indicated by a dashed line in a case where the insufficient shifting as described above is performed as a result of first drive processing execution. In this case, the pin 28a returns to the reference position by using the inclined surface 25 of the pin return section following the cam switching section X3 of the second cycle after second drive processing execution. As a result, the pin return signal (dashed line) is detected in the return detection period of the second cycle.

The pin drive timing (energization initiation timing) may vary with the engine rotation speed or the oil temperature as described in 2-1 above. Accordingly, the pin drive timing of the second drive processing may differ from the pin drive timing of the first drive processing depending on second drive processing execution period or oil temperature condition during second drive processing execution.

3-2-3. Abnormality Determination Processing

In the abnormality determination processing according to the present embodiment, a determination is made that the cam switching mechanism 20 has an abnormality that the drive cam is not switched from the intake cam (first earn) 16 to the intake cam (second cam) 14 by the first drive processing in a case where the pin return signal is detected in the (regular) return detection period of the second cycle as a result of second drive processing execution. More specifically, the abnormality described above is an abnormality that the drive cam is not switched because the cam carrier 22 does not shift normally although the pin 28a normally enters and leaves the guide groove 26a by the first drive processing.

In a case where the pin return signal is not detected in the return detection period of the second cycle after second drive processing execution (case where the pin return signal is generated in the pin return section (not illustrated) of the cycle immediately preceding the second cycle), a determination is made that switching from the intake cam (first cam) 16 to the intake cam (second cam) 14 is performed.

3-3. Processing by ECU

Figure 9:
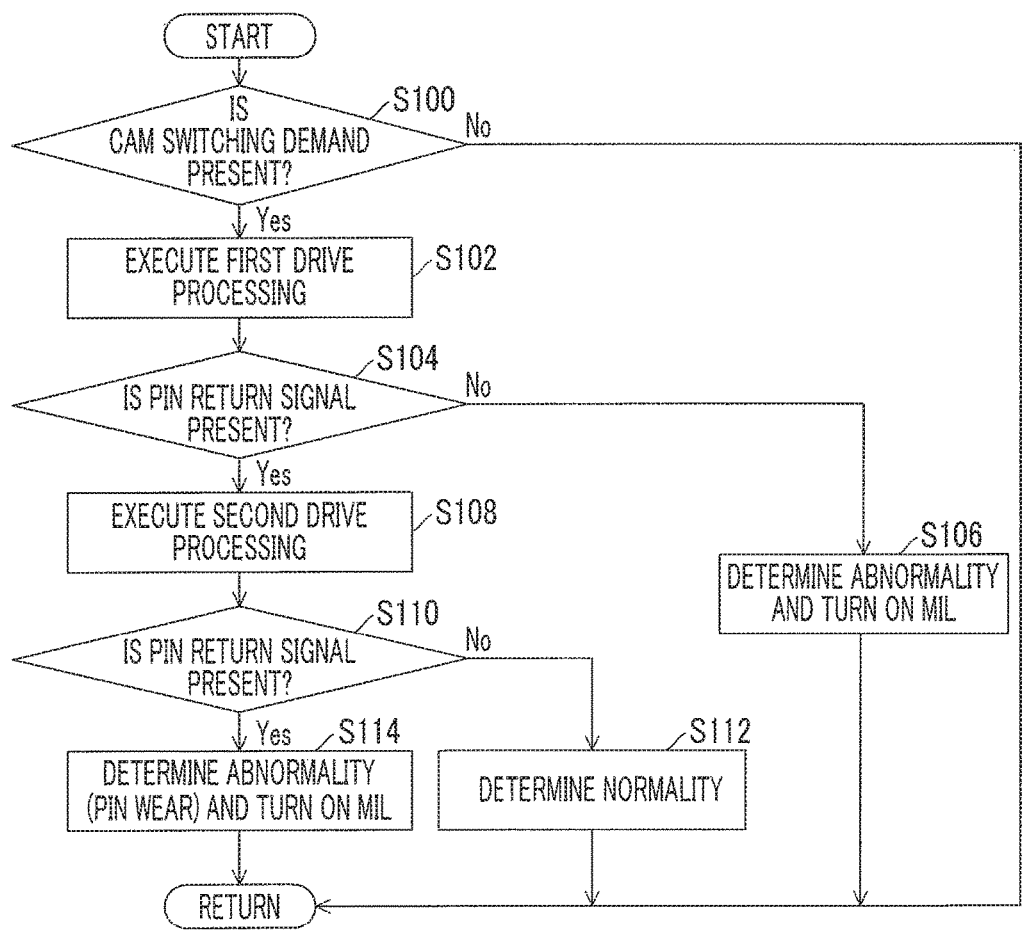
FIG. 9 is a flowchart illustrating a routine relating to the abnormality determination processing of the cam switching mechanism according to the first embodiment.

FIG. 9 is a flowchart illustrating a routine relating to the abnormality determination processing of the cam switching mechanism 20 according to the first embodiment. This routine is repeatedly executed at a predetermined control cycle for each actuator 24 (for each cylinder in the example according to the present embodiment) during the operation of the internal combustion engine 1.

In the routine that is illustrated in FIG. 9, the ECU 50 determines first whether or not the cam switching demand is present (Step S100). The presence or absence of the cam switching demand is determined based on, for example, whether or not there is a change in needed intake cam (small cam 14 or large cam 16) in accordance with a change in engine operation conditions (mainly, engine load and engine rotation speed).

In a case where the ECU 50 determines in Step S100 that the cam switching demand is absent, the ECU 50 promptly terminates the current processing cycle of this routine. In a case where the ECU 50 determines that the cam switching demand is present, the ECU 50 executes the first drive processing (Step S102). More specifically, energization of the actuator 24 is executed at the pin drive timing of the cycle (first cycle described above) that is an object of the current cam switching.

Then, the ECU 50 determines whether or not the pin return signal is detected in the return detection period of the first cycle as a result of first drive processing execution (Step S104). More specifically, the peak value of the induced voltage can be used as an example of the pin return signal or an integrated value of the induced voltage with a magnitude equal to or greater than a predetermined value may also be used. The object of the pin return signal may be a signal based on the induced electromotive force generated when the pin 28 returns to the reference position. An induced current may also be used as an example instead of the induced voltage.

In a case where the determination result of Step S104 is negative, that is, in a case where the pin return signal is not detected in the return detection period described above, the ECU 50 determines that the cam switching mechanism 20 has an abnormality (Step S106). In Step S106, the ECU 50 executes processing for turning on the MIL 62 in order to inform the driver of the abnormality. Examples 1 to 4 described above are conceivable as specific examples of the abnormality determined in Step S106.

The ECU 50 proceeds to Step S108 in a case where the determination result of Step S104 is positive, that is, in a case where the pin return signal is detected in the return detection period described above. In Step S108, the ECU 50 executes the second drive processing by using, as an object, combination between the pin 28 and the guide groove 26 that are the same as objects of the first drive processing. In the example of Step S108, the second drive processing is executed for the second cycle corresponding to the pin drive timing arriving first after the pin 28 returns to the reference position after first drive processing execution. In other words, in this example, the first drive processing and the second drive processing are continuously executed at the shortest interval.

Next, the ECU 50 determines whether or not the pin return signal is detected in the return detection period of the second cycle as a result of second drive processing execution (Step S110) The ECU 50 executes normality determination (Step S112) in a case where the determination result of Step S110 is negative, that is, in a case where the pin return signal is not detected in the regular return detection period after second drive processing execution although the pin return signal is detected in the regular return detection period after first drive processing execution. Specifically, the ECU 50 determines that drive cam switching based on the cam switching demand of Step S100 is normally performed.

The ECU 50 is capable of determining that drive cam switching based on the cam switching demand is not performed correctly in a case where the determination result of Step S110 is positive, that is, in a case where the pin return signal is detected in the respective regular return detection periods after the execution of the first drive processing and the second drive processing. Accordingly, in this case, the ECU 50 determines that the cam switching mechanism 20 has an abnormality that the drive cam is not switched by the first drive processing (Step S114). Also in Step S114, the ECU 50 executes the processing for turning on the MIL 62 in order to inform the driver of the abnormality.

In a case where the processing of Step S114 is executed unlike in the example described above, a MIL other than the MIL 62 turned on in a ease where the abnormality determination of Step S106 is executed may also be turned on. In other words, different MILs may be turned on in accordance with different causes of abnormalities.

4. Effect of Abnormality Determination Processing of Cam Switching Mechanism According to First Embodiment According to the processing of the routine that is illustrated in FIG. 9 described above, the ECU 50 executes the second drive processing by using, as an object, combination between the pin 28 and the guide groove 26 that are the same as objects of the first drive processing in a case where the pin return signal is correctly detected as a result of first drive processing execution. Under the configuration premise of the cam switching mechanism 20 according to the present embodiment, the pin return signal is not detected in the regular return detection period even when the second drive processing is executed in a case where the cam switching operation is correctly performed by the first drive processing. In the case of an abnormality attributable to pin wear or the like, the pin return signal is detected in the regular return detection period during first drive processing execution and second drive processing execution alike. Therefore, according to the abnormality determination processing of this routine, the abnormality determination of the cam switching mechanism 20 can be executed while an example in which the cam switching mechanism 20 has an abnormality attributable to pin wear or the like and an example in which the cam switching operation is normally performed are distinguished.

In the example of the processing of the routine described above, the second cycle that is an object of the second drive processing is a cycle corresponding to the pin drive timing arriving first after the pin 28 returns to the reference position after first drive processing execution. In other words, in this example, the first drive processing and the second drive processing are continuously executed at the shortest interval. As a result, an abnormality of the cam switching mechanism 20 attributable to pin wear or the like can be more rapidly determined than in an example in which the first drive processing and the second drive processing have a relatively long interval.

Example in Which Abnormality Determination Processing is Collectively Performed after Execution of First Drive Processing and Second Drive Processing In the routine that is illustrated in FIG. 9, the second drive processing is executed in a case where the pin return signal is detected in Step S104 after first drive processing execution (that is, in a case where the pin 28 returns to the reference position by using the pin return section following the cam switching section of the first cycle after first drive processing execution). However, the first drive processing, the second drive processing, and the abnormality determination processing following the first drive processing and the second drive processing may also be executed as follows unlike in the above-described example. In other words, abnormality determination processing similar to that according to the first embodiment may also be executed by the presence or absence of the pin return signals corresponding to the first drive processing and the second drive processing being collectively determined after sequential execution of the first drive processing and second drive processing. Specifically, for example, the routine that is illustrated in FIG. 9 may be executed, in which Step S108 is positioned as a result of modification between the processing of Step S102 and Step S104 on condition that the presence or absence of the pin return signals corresponding to the first drive processing and the second drive processing are stored.

Another Example of Abnormality Determination Processing According to First Embodiment In the cam switching mechanism 20 provided with the guide groove 26 that has the overlap, the pin 28 returns to the reference position by using the inclined surface 25 of the pin return section following the cam switching section X2 of the cycle immediately preceding the second cycle after second drive processing execution as described above in a case where the cam switching operation is normally performed by the first drive processing. As the determination processing for proceeding to the normality determination of Step S112 in the routine illustrated in FIG. 9, the following determination processing may be executed instead of determining non-detection of the pin return signal in the regular return detection period of the second cycle in Step S110. In other words, the ECU 50 may also determine whether or not the pin returns to the reference position by using the pin return section following the cam switching section of the cycle immediately preceding the second cycle after second drive processing execution. In a case where the result of the determination processing described above is positive, the ECU 50 may determine that drive cam switching is normally performed in Step S112 (may determine that switching from the first cam to the second cam is performed in an example in which the shift member is shifted from the first position to the second position). The above-described returning of the pin to the reference position using the pin return section of the cycle immediately preceding the second cycle can be determined by, for example, the pin return signal being detected after a pin return detection period corresponding to the pin return section is provided.

In the above description of the first embodiment, the cam switching operation resulting from shifting of the shift member (cam carrier 22) from the first position to the second position and the abnormality determination processing entailed by the cam switching operation are applied to an example of the cam switching operation from the intake cam (large cam) 16 to the intake cam (small cam) 14 using combination between the guide groove 26a and the pin 28a. However, the cam switching operation resulting from shifting of the shift member (cam carrier 22) from the first position to the second position and the abnormality determination processing entailed by the cam switching operation are similarly established even in the opposite case where the cam switching operation and the abnormality determination processing are applied to an example of the cam switching operation from the intake cam (small cam) 14 to the intake cam (large cam) 16 using combination between the guide groove 26b and the pin 28b. The same applies to the following embodiment.

Second Embodiment

A second embodiment of the present disclosure will be described with reference to FIG. 10.

1. Configuration of System and Cam Switching Operation According to Second Embodiment FIG. 10 is a diagram for showing a shape example of a guide groove 72 and the operation of the pin 28a and a change in the voltage of the actuator 24 (coil 32) at a time when abnormality determination processing of a cam switching mechanism 70 is executed according to the second embodiment.

Non-Setting of Overlap of Guide Groove

Figure 10:
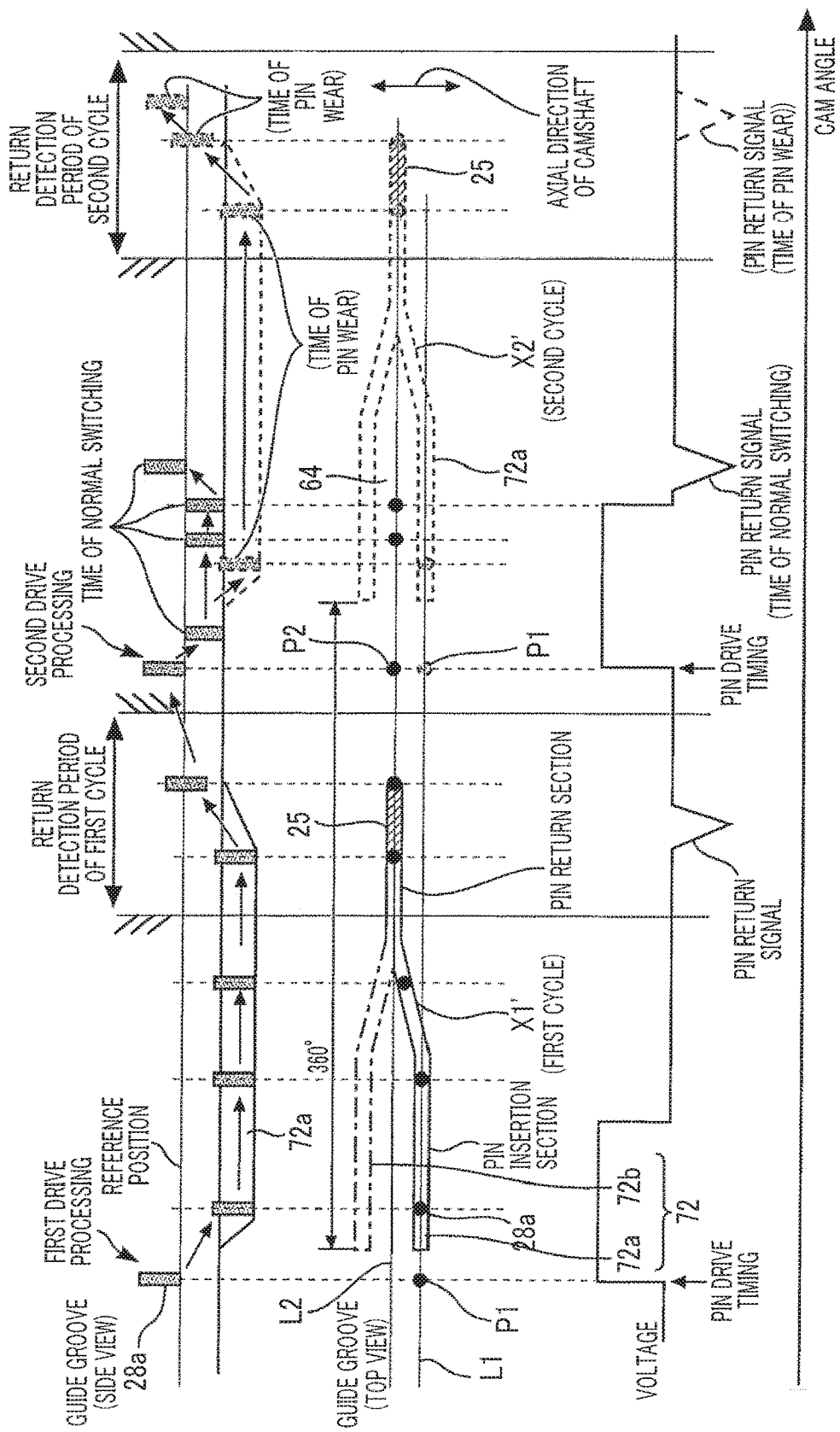
FIG. 10 is a diagram for showing a shape example of a guide groove and the operation of the pin and a change in actuator voltage at a time when abnormality determination processing of a cam switching mechanism is executed according to a second embodiment.

As illustrated in FIG. 10, the guide groove 72 according to the present embodiment is formed across a cam angle section of less than 360° (one round of the cam carrier 22). Accordingly, the guide groove 72 (72a, 72b) has no overlap.

The configuration of the system according to the second embodiment is similar to the configuration that illustrated in FIGS. 1 to 4 except that the shape of the guide groove 72 (72a, 72b) of the cam switching mechanism 70 differs from the shape of the guide groove 26 (26a, 26b) illustrated in FIG. 1 as described above. Likewise, the cam switching operation according to the present embodiment is similar to the cam switching operation according to the first embodiment.

2. Abnormality Determination Processing of Cam Switching Mechanism (Cam Switching Operation) According to Second Embodiment 2-2-1. First Drive Processing In a case where the cam switching operation is normally performed as a result of the execution of the first drive processing for the first cycle, the pin 28a returns to the reference position in the pin return section following a cam switching section X1' of the first cycle as illustrated in FIG. 10. Accordingly, as in the example of the first embodiment, the pin return signal is detected in the return detection period (regular return detection period) of the first cycle.

2-2-2. Second Drive-Processing

When Cam Switching Operation is Normally Performed by First Drive Processing

In the example that is illustrated in FIG. 10, the cycle that corresponds to the pin drive timing arriving first after the pin 28a returns to the reference position after first drive processing execution is a cycle following the first cycle. In the present embodiment, the cycle following the first cycle is used as the second cycle that is an object of the second drive processing. In other words, also in the present embodiment, the first drive processing and the second drive processing are continuously executed at the shortest interval.

Also in the example that is illustrated in FIG. 10, the position of the pin 28a based on the guide groove 72a is on the straight line L2 in a case where the cam switching operation is normally performed as a result of first drive processing execution. FIG. 10 is an example of the overlap-less guide groove 72. Accordingly, the pin 28a allowed to protrude toward the cam carrier 22 by the second drive processing is seated on the outer peripheral surface 64 of the cam carrier 22 without being inserted into the pin return section of the immediately preceding cycle as in the example illustrated in FIG. 8.

In the configuration example of the actuator 24 illustrated in FIG. 3, the pin 28a returns to the reference position by the magnetic portion 29 of the pin 28a being suctioned by the electromagnet 30a closer than the wall surface 37 once energization is stopped in a small stroke state where the pin 28a is seated on the outer peripheral surface 64. In addition, as a result of the above-described configuration, the cam switching mechanism 70 provided with the overlap-less guide groove 72 has the function that the "pin returns to the reference position before the arrival of the pin return section following the cam switching section arriving first after the pin drive timing of the pin drive operation (pin return section of the second cycle in the example that is illustrated in FIG. 10) in a case where the pin drive operation is executed when the shift member (cam carrier 22) is at the second position" as is the case with the cam switching mechanism 20.

In the example that is illustrated in FIG. 10, the pin return signal is generated when the pin 28a returns to the reference position before the arrival of the pin return section of the second cycle by energization being stopped. In other words, also in the example of the cam switching mechanism 70 that has the guide groove 72 which has the profile illustrated in FIG. 10, the pin return signal (solid line) is not detected during the (regular) return detection period of the second cycle in a case where the cam switching operation is normally performed as a result of first drive processing execution.

Even in a case where the guide groove has no overlap, the cycle corresponding to the pin drive timing arriving first after the pin 28a returns to the reference position after first drive processing execution may be the cycle after two cycles from the first cycle, unlike in the example illustrated in FIG. 10, depending on guide groove profile. Still, even in the example in which the cycle after two cycles from the first cycle is the second cycle, the pin 28a allowed to protrude by the second drive processing is seated on the outer peripheral surface 64 and returns to the reference position by energization being stopped before entering the pin return section of the second cycle in a case where the cam switching operation is normally performed as a result of first drive processing execution as is the case with the example illustrated in FIG. 10.

When Pin Wear Occurs

Also in the example that is illustrated in FIG. 10, the position of the pin 28a at a time when the pin drive tuning of the second cycle arrives is P1, not P2, as indicated by a dashed line in a case where insufficient shifting attributable to pin wear or the like is performed as a result of the first drive processing. In this case, the pin 28a returns to the reference position by using the inclined surface 25 of the pin return section following a cam switching section X2' of the second cycle after second drive processing execution. As a result, the pin return signal (dashed line) detected in the (regular) return detection period of the second cycle.

2-2-3. Abnormality Determination Processing

As described above, also in the example of the cam switching mechanism 70 provided with the overlap-less guide groove 72, whether or not the phi return signal is detected in the return detection period of the second cycle depends on whether an abnormality has occurred due to pin wear or the like or whether the cam switching operation is, normally performed as a result of first drive processing execution. Accordingly, also in the present embodiment, the abnormality determination processing according to the first embodiment that is illustrated in FIG. 9 is similarly executed. As a result, the abnormality determination of the cam switching mechanism 20 can be executed while an example in which the cam switching mechanism 20 has an abnormality attributable to pin wear or the like and an example in which the cam switching operation is normally performed are distinguished.

Another Example of Abnormality Determination Processing According to Second Embodiment In the cam switching mechanism 70 provided with the overlap-less guide groove 72, the pin 28 returns to the reference position before the arrival of the pin return section of the second cycle as described above in a case where the cam switching operation is normally performed by the first drive processing. As the determination processing for proceeding to the normality determination of Step S112 in the routine illustrated in FIG. 9, the following determination processing may be executed instead of determining non-detection of the pin return signal in the regular return detection period of the second cycle in Step S110. In other words, the ECU 50 may also determine whether or not the pin returns to the reference position before the arrival of the pin return section following the cam switching section of the second cycle after second drive processing execution. In a case where the result of the determination processing described above is positive, the ECU 50 may determine that drive cam switching is normally performed in Step S112 (may determine that switching from the first cam to the second cam is performed in an example in which the shift member is shifted from the first position to the second position). The above-described returning of the pin to the reference position before the arrival of the pin return section of the second cycle can be determined by, for example, the pin return signal being detected after a predetermined return detection period is provided ahead of the pin return section.

Third Embodiment

A third embodiment of the present disclosure will be described with reference to FIG. 11.

1. Configuration of System According to Third Embodiment

In the following description, the system according to the first embodiment is used as an example of the system according to the third embodiment. Alternatively, the system according to the second embodiment that uses the cam switching mechanism 70 may be used.

2. Abnormality Determination Processing and Warning Processing of Cam Switching Mechanism (Cam Switching Operation) According to Third Embodiment 2-1. Example of Execution Period of Pin Double Striking Hereinafter, driving (protrusion) of the pin 28 resulting from one cam switching demand being performed twice by the first drive processing and the second drive processing described above will be referred to as "pin double striking". In the first and second embodiments described above, the pin double striking is executed for each cam switching demand. However, execution of unneeded pin double striking needs to be avoided from the viewpoints of low electric power consumption and quietness of the internal combustion engine 1.

It is conceivable that pin wear that leads to insufficient shifting of the cam carrier 22 is likely to occur after the pin drive frequency for cam switching increases to some extent. In the present embodiment, the pin double striking is executed after the pin drive frequency exceeds a predetermined value.

2-2. Pin Wear Warning Processing

In addition, in the present embodiment, the MIL 62 is turned on for promoting inspection of the pin 28 in a case where the pin drive frequency exceeds the predetermined value.

2-3. Processing by ECU

Figure 11:
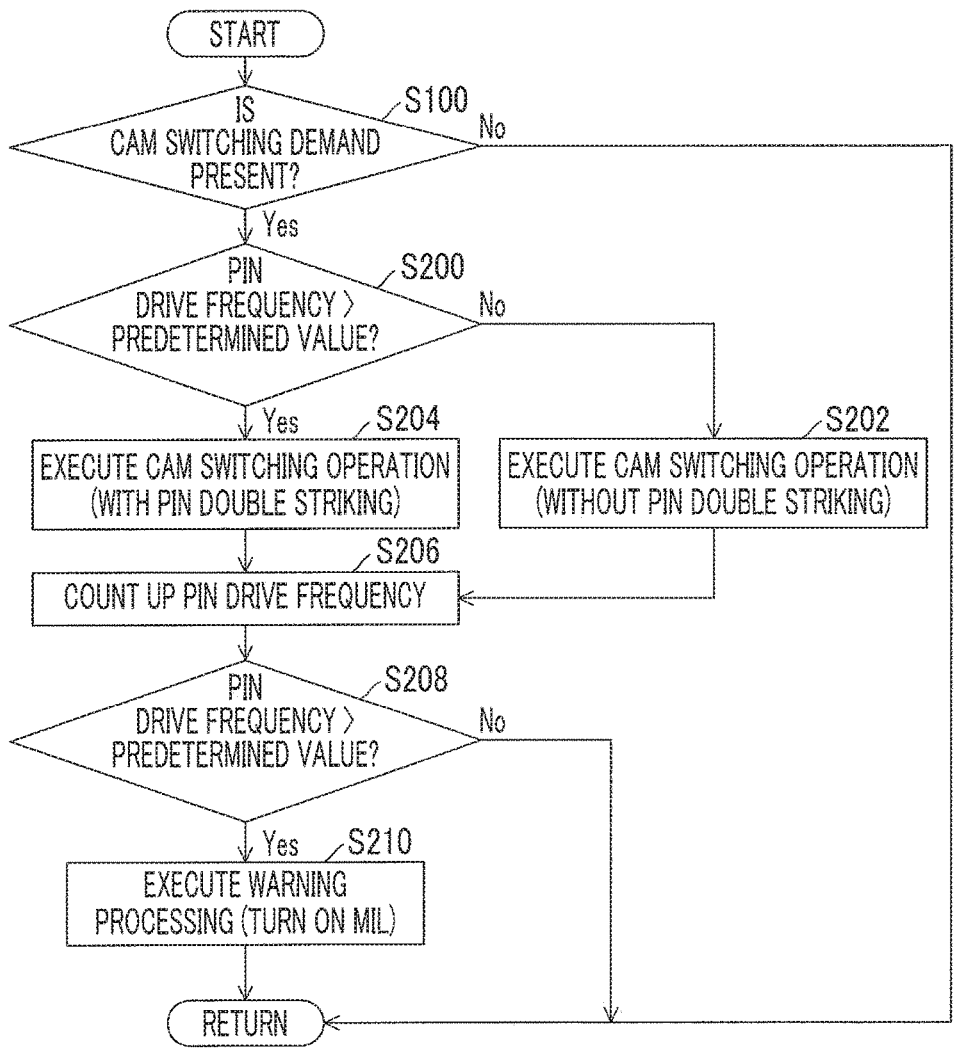
FIG. 11 is a flowchart illustrating a routine relating to abnormality determination processing and warning processing of a cam switching mechanism according to a third embodiment.

FIG. 11 is a flowchart illustrating a routine relating to the abnormality determination processing and the warning processing of the cam switching mechanism 20 according to the third embodiment. This routine is repeatedly executed at a predetermined control cycle for each actuator 24 (for each cylinder) during the operation of the internal combustion engine 1 as is the case with the routine illustrated in FIG. 9.

In the routine that is illustrated in FIG. 11 the ECU 50 proceeds to Step S200 in a case where the ECU 50 determines in Step S100 that the cam switching demand is present. In Step S200, the ECU 50 determines whether or not the pin drive frequency exceeds a predetermined value. More specifically, the pin drive frequency is counted for each pin 28 after factory shipment of the internal combustion engine 1 with the same pin 28a or pin 28b used as an object.

In a case where the determination result of Step S200 is negative (pin drive frequency≤predetermined value), the ECU 50 executes the cam switching operation without the pin double striking (Step S202). The processing of Step S202 corresponds to the processing of Step S102 illustrated in FIG. 9.

In a case where the determination result of Step S200 is positive (pin drive frequency>predetermined value), the ECU 50 executes the cam switching operation with the pin double striking (Step S204). The processing of Step S204 corresponds to the sequential processing of Steps S102 to S114 illustrated in FIG. 9. Accordingly, in Step S204, the abnormality determination processing of the cam switching mechanism 20 is also executed.

After the processing of Step S202 or S204, the ECU 50 executes processing for counting up the pin drive frequency and storing the updated pin drive frequency in the memory of the ECU 50 (Step S206).

Next, the ECU 50 determines whether or not the pin drive frequency exceeds the predetermined value (Step S208). In a case where the determination result of Step S208 is negative (pin drive frequency predetermined value), the ECU 50 promptly terminates the current processing cycle of this routine. In a case where the determination result of Step S208 is positive (pin drive frequency>predetermined value), the ECU 50 executes the warning processing for turning on the MIL 62 in order to promote inspection of the pin 28 (Step S210).

3. Effect of Abnormality Determination Processing and Warning Processing of Cam Switching Mechanism (Cam Switching Operation) According to Third Embodiment According to the routine that is illustrated in FIG. 11 described above, the pin double striking is executed after the pin drive frequency exceeds a predetermined value. Accordingly, unneeded pin double striking being executed when wear of the pin 28 shows little progress can be avoided. According to the warning processing of the routine described above, the driver can be informed of the possibility of pin wear attributable to an increase in pin drive frequency apart from turning on of the MIL 62 depending on the result of the abnormality determination processing in Step S204.

Another Example of Execution Period of Pin Double Striking

The pin double striking may also be executed for each predetermined rotation or the like unlike the above-described the example in which the pin double striking is executed after the pin drive frequency exceeds a predetermined value.

In addition, the pin double striking may be executed on, for example, predetermined operation conditions. Specifically, pin double striking execution may be prohibited in a low engine rotation speed region at or below a predetermined value from the viewpoint of quietness of the internal combustion engine 1. Once the pin double striking is performed during a transient operation in which the engine rotation speed transiently changes, the upper limit of the engine rotation speed at which the pin 28 can be inserted into the guide groove 26 may be exceeded during pin double striking execution. Accordingly, pin double striking execution may be prohibited when a transient operation for increasing the engine rotation speed is executed in a high engine rotation speed region at or above a predetermined value. When the voltage of the battery 38 supplying electric power to the actuator 24 is relatively low, the operation speed of the pin 28 may decrease and the abnormality determination processing by the pin double striking may be hindered. Accordingly, pin double striking execution may be prohibited in a case where the voltage of the battery 38 is equal to or less than a predetermined value.

Another Embodiment

Another Selection Example of Second Cycle

In the first to third embodiments described above, the first drive processing and the second drive processing are continuously executed at the shortest interval. However, selection examples of the second cycle that is an object of the second drive processing are not limited thereto. In other words, the second drive processing may also be executed for, for example, any second cycle arriving while a predetermined operation condition is used in the case of transition of the operation condition of the internal combustion engine 1 to the predetermined operation condition following first drive processing execution on condition that the second cycle corresponds to a cycle in which switching from the second cam to the first earn is not performed after the first drive processing. More specifically, in a case where the first drive processing is executed for the first cycle during a transient operation in which the operation condition (such as the engine rotation speed) of the internal combustion engine 1 transiently changes, for example, the second drive processing may be executed on the predetermined operation condition following settlement of the transient operation condition change. From the viewpoint of quietness needed for the internal combustion engine 1, the second cycle may also be selected when an engine rotation speed higher than the engine rotation speed at a time when the first cycle is performed is used. During high engine rotation, the noise of the internal combustion engine as a whole is relatively large. Therefore, according to this example, the sound generated during second drive processing execution (hitting sound of the pin 28) being heard loud by an occupant of the vehicle can be further suppressed. The number of the second cycles is not necessarily limited to one. Accordingly, the second drive processing may be repeated if needed.

Another Example of Pin Return Detection

In the first to third embodiments described above, the pin return signal based on the induced electromotive force (such as the induced voltage) generated in the actuator 24 (coil 32) when the pin 28 returns to the reference position is used for the pin return detection. According to the above-described method, the abnormality determination processing is performed without sensor addition in the example in which the actuator of the cam switching mechanism is an electromagnetic solenoid-type actuator. However, detection of the returning of the pin to the reference position can also be performed by means of, for example a pin operation position detected by a pin operation position detection sensor (such as a Hall sensor using the Hall effect) unlike in the above-described example. Accordingly, a Hall element (Hall sensor) or the like may be provided for the pin return detection at an appropriate position around the pin.

Combination of each of the examples disclosed in the above-described embodiments and each other modification example other than the described combination may also be appropriately performed within an allowable range, and various modifications are possible within the scope of the present disclosure.

What is claimed is:

1. A control device for an internal combustion engine comprising:
   a camshaft;
   a plurality of cams having different profiles;
   a cam switching mechanism configured to switch a drive cam as a valve-driving cam between the cams, the cam switching mechanism including a shift member, a pin, an actuator, and a position regulation mechanism, the shift member being configured to rotate with the camshaft, the shift member being configured to shift an axial position with respect to the camshaft in conjunction with the cams, the shift member being provided with a guide groove in an outer peripheral surface of the shift member, the pin being configured to be engaged with and disengaged from the guide groove, the actuator being configured to execute a pin drive operation for allowing the pin to protrude from a reference position toward the shift member, the position regulation mechanism being configured to cause the axial position of the shift member to be a first position or a second position as a result of regulation, the guide groove including a pin insertion section, a cam switching section, and a pin return section, the actuator being configured to execute the pin drive operation for driving the pin to protrude from the reference position toward the shift member at a pin drive timing for inserting the pin into the pin insertion section of the guide groove, the cam switching section being configured such that the shift member shifts from the first position to the second position as the shift member rotates when the pin is inserted into the pin insertion section, the pin return section being configured such that the pin returns to the reference position after the pin passes through the cam switching section, the drive cam being configured to be switched from a first cam to a second cam included in the cams as the shift member shifts from the first position to the second position in the cam switching section, and the cam switching mechanism being configured such that the pin returns to the reference position before arrival of the pin return section following the cam switching section arriving first after the pin drive timing in a case where the pin drive operation is executed when the shift member is at the second position; and an electronic control unit configured to
- execute, for a first cycle, first drive processing for controlling the actuator such that the pin drive operation is executed for switching from the first cam to the second cam,
- execute second drive processing for controlling the actuator such that the pin drive operation is executed again for a second cycle in which switching from the second cam to the first cam is not performed after the execution of the first drive processing, the second cycle being a cycle following the first cycle, and
- execute abnormality determination processing for determining that the cam switching mechanism has an abnormality that the drive cam is not switched from the first cam to the second cam by the first drive processing in a case where the pin returns to the reference position by using the pin return section following the cam switching section of the first cycle after the execution of the first drive processing and the pin returns to the reference position by using the pin return section following the cam switching section of the second cycle after the execution of the second drive processing.

2. The control device according to claim 1, wherein the electronic control unit is configured to determine that the drive cam is switched from the first cam to the second cam by the first drive processing in a case where the pin returns to the reference position by using the pin return section following the cam switching section of the first cycle after the execution of the first drive processing and the pin does not return to the reference position by using the pin return section following the cam switching section of the second cycle after the execution of the second drive processing in the abnormality determination processing.

3. The control device according to claim 2, wherein:
- the guide groove is formed such that the pin insertion section and the pin return section do not overlap each other in a circumferential direction of the shift member; and
- the electronic control unit is configured to determine that the drive cam is switched from the first cam to the second cam by the first drive processing in a case where the pin returns to the reference position by using the pin return section following the cam switching section of the first cycle after the execution of the first drive processing and the pin returns to the reference position before arrival of the pin return section following the cam switching section of the second cycle after the execution of the second drive processing in the abnormality determination processing.

4. The control device according to claim 1, wherein the second cycle is a cycle corresponding to the pin drive timing arriving first after the pin returns to the reference position after the execution of the first drive processing.

5. The control device according to claim 1, wherein the second drive processing is executed for the second cycle arriving while a predetermined operation condition is used in a case of transition of an operation condition of the internal combustion engine to the predetermined operation condition after the execution of the first drive processing.

6. The control device according to claim 1, wherein:
- the guide groove is formed such that at least a part of the pin insertion section and at least a part of the pin return section overlap each other in a circumferential direction of the shift member; and
- the electronic control unit is configured to determine that the drive cam is switched from the first cam to the second cam by the first drive processing in a case where the pin returns to the reference position by using the pin return section following the cam switching section of the first cycle after the execution of the first drive processing and the pin returns to the reference position by using the pin return section following the cam switching section of a cycle immediately preceding the second cycle after the execution of the second drive processing in the abnormality determination processing.

7. The control device according to claim 1, wherein the electronic control unit is configured to determine the returning of the pin to the reference position based on an induced electromotive force generated in the actuator when the pin returns.

* * * * *